(12) United States Patent
Cherkaoui et al.

(10) Patent No.: US 8,105,662 B2
(45) Date of Patent: Jan. 31, 2012

(54) ADDITIVE COMPONENTS FOR LIQUID CRYSTALLINE MATERIALS

(75) Inventors: Zoubair Mohammed Cherkaoui, Niederdorf (CH); Teodor Lukac, Basel (CH); Joachim Reichardt, Grenzach-Wyhlen (DE); Klaus Schmitt, Lörrach (DE)

(73) Assignee: Rolic AG, Zug (CH)

( * ) Notice: Subject to any disclaimer, the term of this patent is extended or adjusted under 35 U.S.C. 154(b) by 1111 days.

(21) Appl. No.: 10/581,716

(22) PCT Filed: Nov. 25, 2004

(86) PCT No.: PCT/CH2004/000709
§ 371 (c)(1),
(2), (4) Date: Jun. 5, 2006

(87) PCT Pub. No.: WO2005/054406
PCT Pub. Date: Jun. 16, 2005

(65) Prior Publication Data
US 2007/0257230 A1    Nov. 8, 2007

(30) Foreign Application Priority Data

Dec. 4, 2003   (EP) .................................. 03405861
Jan. 30, 2004   (EP) .................................. 04405060

(51) Int. Cl.
C09K 19/38   (2006.01)
C09K 19/58   (2006.01)
C09K 19/20   (2006.01)
C07C 69/76   (2006.01)
G02F 1/13    (2006.01)

(52) U.S. Cl. .... 428/1.1; 428/1.3; 252/299.1; 252/299.5; 252/299.67; 560/76; 560/95; 349/88

(58) Field of Classification Search ............... 560/76, 560/104, 113, 95; 252/299.01, 299.5, 299.67; 428/1.1, 1.3; 349/88
See application file for complete search history.

(56) References Cited

U.S. PATENT DOCUMENTS

| 6,676,851 B1 * | 1/2004 | Buchecker et al. ...... 252/299.67 |
| 6,733,690 B1 * | 5/2004 | Lukac et al. ............. 252/299.67 |
| 6,746,729 B1 * | 6/2004 | Cherkaoui et al. ............. 428/1.1 |

FOREIGN PATENT DOCUMENTS

| WO | WO 00/04110 A1 | 1/2000 |
| WO | WO 00/48985 A1 | 8/2000 |
| WO | WO 00/55110 A1 | 9/2000 |
| WO | WO 00/63154 A1 | 10/2000 |
| WO | WO 01/47862 A1 | 7/2001 |

OTHER PUBLICATIONS

International Preliminary Report on Patentability.

* cited by examiner

*Primary Examiner* — Shean Wu
(74) *Attorney, Agent, or Firm* — Sughrue Mion, PLLC

(57) ABSTRACT

The present invention relates to mesogenic, cross-linkable mixtures comprising (i) a cross-linkable liquid crystalline host compound comprising at least one cross-linkable liquid crystalline compound, and (ii) at least one chiral or achiral rod shaped additive component, wherein said additive component has a rigid core and comprises at least two fused or linked, optionally substituted, non-aromatic, aromatic, carbocyclic or heterocyclic groups, and also comprises at least one optionally substituted alkyl residue, and at least one polymerizable group and wherein the additive component has a transition temperature to the isotropic state of 40° C. or lower. The invention also relates to the novel chiral or achiral rod-shaped additive compounds used for the preparation of these mixtures, to mixtures according to the invention in form of an elastomer, polymer gel, polymer network or polymer film, to polymer networks and liquid crystalline polymer films prepared from these mixtures and to optical or electrooptical components comprising polymer networks and liquid crystalline polymer films prepared from such mixtures. Further, the invention relates to the use of the chiral or achiral rod shaped compounds as components of a cross-linkable liquid crystalline mixture in the production of orientated liquid crystalline polymers, to liquid crystalline mixtures comprising these compounds, to liquid crystalline polymers and liquid crystalline polymer networks prepared from such liquid crystalline mixtures, and to liquid crystalline devices comprising these compounds.

17 Claims, No Drawings

ADDITIVE COMPONENTS FOR LIQUID CRYSTALLINE MATERIALS

The present invention relates to mesogenic, cross-linkable mixtures comprising at least one cross-linkable liquid crystalline host compound and at least one novel chiral or achiral rod shaped compound as additive component, to novel chiral or achiral rod-shaped compounds used for the preparation of these mixtures, to mixtures according to the invention in form of an elastomer, polymer gel, polymer network or polymer film, to polymer networks and liquid crystalline polymer films prepared from these mixtures and to optical or electro-optical components comprising polymer networks and liquid crystalline polymer films prepared from such mixtures. More particularly, it relates to the use of the chiral or achiral rod shaped compounds as components of a cross-linkable liquid crystalline mixture in the production of orientated liquid crystalline polymers, to liquid crystalline mixtures comprising these compounds, to liquid crystalline polymers and liquid crystalline polymer networks prepared from such liquid crystalline mixtures, and to liquid crystalline devices comprising these compounds.

Liquid crystalline polymers (LCPs) are used in the manufacture of optical devices and components such as for example waveguides, optical gratings, filters, retarders, coatings, films, piezoelectric cells and non-linear optical cells. The right choice of the LCP used in any one of the aforementioned optical devices and components depends upon its associated optical properties such as the optical anisotropy, refractive index, transparency and dispersion. Optical filters, for example, contain LCPs having a large anisotropy (Δn) and a low dispersion (n=f(λ)).

Usually LCPs are manufactured by orientating a layer of a cross-linkable liquid crystalline (LC) single compound or of a mixture of different cross-linkable liquid crystalline single compounds on a substrate provided with an orientation layer [e.g. a substrate provided with an orientation layer obtained through rubbing or linear photo-polymerization (LPP)] or by shearing a single cross-linkable liquid crystalline compound or a mixture of different cross-linkable liquid crystalline single compounds along a preferential direction, followed by cross-linking the liquid crystalline layer to form a anisotropic polymer network. In the manufacture of optical components using LCPs, the orientation quality in relation to crucial process parameters, like orientation time, backing temperature, etc, plays a predominant role. The orientation quality is directly related to material parameters, in principle mainly to the macromolecular packing in the liquid crystalline state which itself is largely determined by the viscosity of the applied material. It is believed that sub-optimal material parameters are one of the major reasons for preventing good orientation (alignment), for example in the preparation of LCPs films aimed to have a high thickness, or when using materials comprising high molecular weight components (such as dimers, oligomers, etc). Typical orientation defects frequently observed and known to the skilled person are for example schlieren texture, focal conical fan texture, zigzag defects, pre-tilt mono-domain variability, etc. The elimination of these defects can be attempted for example through thermal post backing processes. However, in general these steps are insufficient and do not lead to the required qualities, even when applied over extended time periods (which by itself is clearly a major disadvantage for use in industrial manufacturing processes). LC starting materials having a high-viscosity profile are less suitable for the quick and easy manufacture of oriented films and coatings of high quality.

Cross-linkable liquid crystalline compounds used in the manufacture of LCPs must be chemically and thermally stable, stable to electromagnetic radiation, soluble in standard solvents and miscible with other liquid crystalline components, and should exhibit liquid crystalline properties in the range of −30° C. to +150° C., preferably in the range of 0° C. to 120° C. The configuration imposed by the orientation layer on the polymerizable liquid crystalline single compounds or mixtures of liquid crystalline single compounds gets frozen in once the LCP network is formed by cross-linking. The resulting LCP films and coatings should preferably have a high viscosity profile and should be stable when exposed to mechanical stresses, elevated temperatures and light.

There is therefore a need for liquid crystalline single compounds or mixtures of liquid crystalline compounds having a broad thermal liquid crystalline range and which can be easily orientated on a substrate prior to cross-linking in such a way that the orientation of the liquid crystalline single compounds or mixtures of liquid crystalline single compounds on the substrate remains stable over the entire time period required for producing the LCP network.

Doping liquid crystalline mixtures with small amounts of certain additives, such as paraffins, offers to a certain extent a known way to optimize the mixture's orientation potential without introducing major changes to the physical properties of the underlying key components of the mixture. However, due to incompatibilities occurring at the molecular level between the liquid crystalline compounds and the aforementioned known additives the thermodynamic behavior of the resulting mixture often exhibits unwanted properties, such as a depression of the clearing point, a reduction of the thermal liquid crystalline range, etc, when compared to the host mixture. A further disadvantage frequently seen is the occurrence of miscibility problems between the different components of the mixture, which often leads to difficulties in achieving a uniform orientation of the liquid crystalline materials.

In order to overcome these difficulties the inventors of the present invention have developed a novel class of chiral or achiral additive components comprising at least one polymerizable group. The general molecular architecture of these novel additive components is based on a rod shaped rigid core connected to at least one residue, the latter being responsible for the partial or total suppression of the crystalline or liquid crystalline macromolecular order within the pure (i.e. bulk) additive component. This means that in their pure state the novel chiral or achiral additive components do exhibit low transition temperatures to the isotropic state. The preferred low transition temperatures to the isotropic state of the new additive components according to the invention are equal or below 40° C. In the context of the present invention the term "pure" for pure additive component should be understood in such a way that the purity level of the material is ≧98%, when assessing the transition temperature to the isotropic state.

The term "transition temperature to the isotropic state" as used in the context of this invention is defined as the temperature at which the novel additive components change their state from the crystalline or liquid-crystalline state to the isotropic state.

When added in appropriate concentrations to cross-linkable liquid crystalline compounds or to mixtures of cross-linkable liquid crystalline compounds, some structural elements of the novel chiral or achiral additive components according to the invention tend to segregate from the highly polar part of the LC compounds due to the molecular recognition. This in turn is leading to a reduction of the intermolecular interactions and as a consequence of this also to a better interaction with the orientation layer and thus to the formation of a monodomain.

For the sake of illustration purposes and easy reference those parts of the molecular structure of the novel additive components which are believed to be responsible for the partial or total suppression of the crystalline or the liquid crystalline macromolecular order within the pure additive components are indicated with dotted circles in the structure formulas of the schemes and examples listed below.

By doping various cross-linkable LC compounds or cross-linkable LC compound mixtures with appropriate amounts of the newly developed chiral or achiral additive components highly successful results were obtained in the subsequent orientation and cross-linking steps. In fact perfect transformation into thick LCP single layer films were achieved while leaving the optical performance and properties of the underlying (i.e. non-treated) host LC compounds or host LC compound mixtures unchanged. On top of this a considerable enhancement of the orientation speed could be achieved in comparison with the non-doped host LC compounds or host LC compound mixtures, this being a tremendous advantage in large-scale manufacturing processes. Another benefit is the improvement of the reciprocal compatibility of the components of the host mixtures due to the addition of the new additive components. Furthermore, when added to cholesteric mixtures the novel additive components strongly contribute to the fast formation of a helical pitch (P), i.e. to the fast formation of the cholesteric phase.

Thus, the invention provides in a first aspect mixtures, hereinafter also called mixtures of the invention, comprising at least one cross-linkable liquid crystalline compound and at least one chiral or achiral rod shaped novel additive component as described above, wherein the additive component has a rigid core comprising at least two fused or linked, optionally substituted, non-aromatic, aromatic, carbocyclic or heterocyclic groups, and has at least one optionally substituted alkyl residue, and has at least one polymerizable group.

The invention provides in a second aspect novel chiral or achiral rod shaped compounds as additive components, as described above, wherein the additive component has a rigid core comprising at least two fused or linked, optionally substituted, non-aromatic, aromatic, carbocyclic or heterocyclic groups, and has least one optionally substituted alkyl residue, and has at least one polymerizable group.

The term "optionally substituted" as used in the context of this invention is defined in the subsequent descriptive chapters.

In a preferred embodiment the invention is directed to mesogenic, cross-linkable mixtures comprising:
i) a cross-linkable liquid crystalline host comprising at least one cross-linkable liquid crystalline compound, and
ii) at least one chiral or achiral rod shaped compound as additive component, wherein said additive component has a rigid core and comprises at least two fused or linked, optionally substituted, non-aromatic, aromatic, carbocyclic or heterocyclic groups, and also comprises at least one optionally substituted alkyl residue, and at least one polymerizable group and wherein the additive component has a transition temperature to the isotropic state of 40° C. or lower.

In another preferred embodiment the invention is directed to mixtures of the invention wherein the additive component has a transition temperature to the isotropic state of 20° C. or lower.

In another preferred embodiment the invention is directed to mixtures of the invention wherein the additive component has a transition temperature to the isotropic state of 0° C. or lower.

In another preferred embodiment the invention is directed to mixtures of the invention wherein the mixtures have a clearing temperature of 30° C. or higher.

In another preferred embodiment the invention is directed to mixtures of the invention wherein the mixtures have a clearing temperature of 50° C. or higher.

In another preferred embodiment the invention is directed to mixtures of the invention wherein the liquid crystalline host has a clearing temperature of 50° C. or higher.

When added to a cholesteric mixture the novel additive components are of particular importance and interest with regard to the quick formation of the cholesteric phase.

Based on their specific molecular structure the chiral or achiral additive components according to the invention possess a distinctly pronounced ability to shorten the time up to the completion of the formation of the cholesteric phase (in comparison with the time needed for the formation of the cholesteric phase of the reference or host cholesteric mixture).

In the context of this invention the terms "cross-linkable LC host", "host LC compounds", "host LC compound mixtures" or "host cholesteric mixtures" mean LC compounds, LC compound mixtures or cholesteric mixtures prior to the addition of additive components according to the invention.

The term "cross-linkable LC host" as used herein may represent any cross-linkable LC host material such as a cross-linkable LC host compound, cross-linkable LC host compound mixtures and the like.

The term "clearing temperature" as used in the context of this invention means the temperature at which the transition to the isotropic state occurs.

In order to avoid strong clearing point depression in the final LC compound mixtures [i.e. the mixtures comprising the host LC compounds or host LC compound mixtures plus one or more of the additive components according to the invention] the preferred rod shaped additive components are characterized in having molecular structures compatible with or related to the molecular structures of the main components of the underlying host LC compounds or host LC compound mixtures. Speaking in general terms: seen from the molecular structure level the new rod shaped additive components are preferably compatible with the known liquid crystalline compounds used by the persons skilled in the art.

Therefore additive components of formula (I) are the subject of this invention:

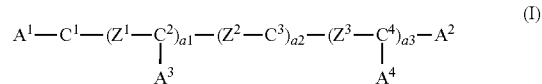

(I)

wherein:
$A^1$ to $A^4$ are independently from each other hydrogen, a polar group such as nitro, cyano, a halogen, an optionally substituted methyl group, or an optionally substituted hydrocarbon group of 2 to 40 C-atoms, in which one or more C-atoms may be replaced by a heteroatom, in such a way that oxygen atoms are not linked to one another, with the proviso that at least one of $A^1$ to $A^4$ comprises a polymerizable group,
$C^1$ to $C^4$ are independently from each other optionally substituted non-aromatic, aromatic, carbocyclic or heterocyclic groups, preferably connected to each other at the opposite positions via the bridging groups $Z^1$ to $Z^3$, $Z^1$ to $Z^3$ are independently from each other —CH(OH)—, —CO—, —CH$_2$(CO)—, —SO—, —CH$_2$(SO)—, —SO$_2$—, —CH$_2$(SO$_2$)—, —COO—, —OCO—, —COCF$_2$—, —CF$_2$CO—, —S—CO—, —CO—S—, —SOO—, —OSO—, —SOS—, —CH$_2$—CH$_2$—, —OCH$_2$—, —CH$_2$O—, —CH=CH—, —C≡C—, —CH=CH—COO—, —OCO—CH=CH—, —CH=N—, —C(CH$_3$)=N—, —N=N— or a single covalent bond, a1, a2 and a3 are independently from each other integers from 0 to 3, such that $1 \leq a1+a2+a3 \leq 3$, with the proviso that the sequence $A^1$-$C^1$-$(Z^1$-$C^2)_{a1}$-$(Z^2$-$C^3)_{a2}$-$(Z^3$-$C^4)_{a3}$-$A^2$ describes the long molecular axis of the rod shaped additive components.

In the context of the present invention the term "hydrocarbon" includes straight-chain and branched alkylene, as well as saturated and unsaturated groups.

The term "optionally substituted" (mono- or poly-substitution) includes substituents such as alkyl, aryl and cycloalkyl groups, as well as amino, cyano, epoxy, halogen, hydroxy, nitro, oxo and other groups.

Possible heteroatoms which may replace carbon atoms include nitrogen, oxygen and sulfur. In the case of nitrogen as heteroatom further substitution is possible with groups such as alkyl, aryl and cycloalkyl.

The terms "alkyl" and "alkylene", as used in the context of the present invention, include straight-chain and branched groups, as well as saturated and unsaturated groups.

The terms "polymerizable group" and "polymerization" as used herein are explained and characterized in the following: Usually two main processes are used to convert monomers into polymers, namely a) chain-growth polymerization and b) step-growth polymerization. For the manufacture of anisotropic films based on LC monomers, chain-growth polymerization is the commonly used process. Here all monomers have only one kind of reactive group that can react to give an active center, which rapidly adds to another monomer molecule, then to another, regenerating the active center each time. This is a typical example of a chain reaction and generally continues until two active centers encounter one other (deactivation). In order to generate an active center, through mild conditions, polymerizable monomers should carry a highly reactive functional group. Furthermore, the active center must add exclusively and rapidly to the same polymerizable group of a neighboring monomer. To ensure these two polymerization conditions, both radical and cationic mechanisms are typically mediating chain-growth polymerization processes. These are employing smooth radical respectively cationic initiators that are producing radical or cationic starting residues through intramolecular decomposition by thermal or by light activation. Such initiators are for example those used in photo-resist polymerization processes, e.g. Irgacure® and its derivatives. Polymerizable groups that are able to undergo rapid, selective and efficient radical or cationic processes are generally consisting of an activated carbon-carbon double bond, such as in methacrylates, acrylates, vinyl acetates, vinyl ethers or of double bonds activated by oxidation. Here the activation is ensured through an electron donor group (oxygen, sulfur, etc) or an electron acceptor group (such as carbonyl, nitrile, carboxy, double bonds, aromatic groups, etc.) directly connected to the double bond.

Further preferred additive components according to the invention are compounds of formula (I) wherein at least one of $A^1$ to $A^4$ includes a polymerizable group, selected from a residue of formula (II)

P-(Sp)$_k$-(X)$_t$—    (II)

wherein:

P is hydrogen or a polymerizable group selected from groups comprising CH$_2$=CW—, CH$_2$=CW—O—, CH$_2$=CW—COO—, CH$_2$=C(Ph)-COO—, CH$_2$=CH—COO-Ph-, CH$_2$=CW—CO—NH—, CH$_2$=C(Ph)-CONH—, CH$_2$=C(COOR')—CH$_2$—COO—, CH$_2$=CH—OOC—, (Ph)-CH=CH—, CH$_3$—CH=N—(CH$_2$)$_{m1}$—, HO—, HS—, HO—(CH$_2$)$_{m1}$—, HS—(CH$_2$)$_{m1}$—, HO(CH$_2$)$_{m1}$COO—, HS(CH$_2$)$_{m1}$COO—, HWN—, HOC(O)—, CH$_2$=CH-Ph-(O)$_{m2}$,

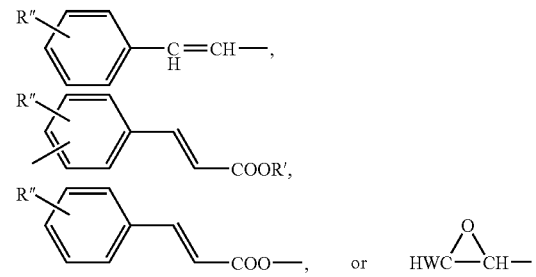

wherein:

W is H, F, Cl, Br or I or a $C_{1-6}$ alkyl group, m1 is an integer having a value of from 1 to 9, m2 is an integer having a value of 0 or 1, R' is a $C_{1-6}$ alkyl group, R" is a $C_{1-6}$ alkyl group, methoxy, cyano, F, Cl, Br or I, Sp is an optionally substituted straight or branched $C_{1-30}$ alkylene group, in which one or more —CH$_2$— groups may be replaced by a heteroatom and/or by a polar group and/or it is optionally possible that one or more carbon-carbon single bond(s) is/are replaced by a carbon-carbon double or a triple bond, k is an integer having a value of from 0 to 4, X is —O—, —S—, —NH—, —N(CH$_3$)—, —CH(OH)—, —CO—, —CH$_2$(CO)—, —SO—, —CH$_2$(SO)—, —SO$_2$—, —CH$_2$(SO$_2$)—, —COO—, —OCO—, —OCO—O—, —S—CO—, —CO—S—, —SOO—, —OSO—, —SOS—, —CH$_2$—CH$_2$—, —OCH$_2$—, —CH$_2$O—, —CH=CH—, —C≡C—, or a single bond, t is an integer having a value of 0 or 1.

In the context of the present invention the term "$C_{1-6}$ alkyl" shall preferably mean straight-chain or branched hydrocarbon radicals having from 1 to 6 carbon atoms, such as for example methyl, ethyl, propyl, butyl, isobutyl, tert-butyl, pentyl, hexyl, but especially methyl, ethyl, propyl, isopropyl or butyl.

In above formula (II) and its further characterizations the term "Ph" is to be understood as denoting optionally substituted phenylene and the term "(Ph)" as denoting optionally substituted phenyl. By the term "phenylene" it should be understood to include 1,2-, 1,3- or 1,4-phenylene, which is optionally substituted. It is preferred that the phenylene group is either a 1,3- or a 1,4-phenylene group.

The $C_{1-30}$ alkylene group "Sp" may comprise branched or straight chain alkylene groups and may be unsubstituted, mono- or polysubstituted by F, Cl, Br, I or CN. Alternatively or in addition one or more of —CH$_2$— groups present in the hydrocarbon chain may be replaced, independently, by one or more groups selected from —O—, —S—, —NH—, —N(CH$_3$)—, —CH(OH)—, —CO—, —CH$_2$(CO)—, —SO—, —CH$_2$(SO)—, —SO$_2$—, —CH$_2$(SO$_2$)—, —COO—, —OCO—, —OCO—O—, —S—CO—, —CO—S—, —SOO—, —OSO—, —SOS—, —CH=CH—, —C≡C—, —(CF$_2$)$_r$—, —(CD$_2$)$_s$— or —C(W$^1$)=C(W$^2$)—, with the proviso that no two oxygen atoms are directly linked to each other. W$^1$ and W$^2$ each is, independently, H, H—(CH$_2$)$_q$— or Cl. The integers r, s and q each independently are a number between 1 and 15.

Further preferred compounds are compounds wherein at least one of A$^1$ to A$^4$ of formula (I) is a group of formula (II):

wherein:

P is a polymerizable group such as CH$_2$=CW—, CH$_2$=CW—O—, CH$_2$=CW—COO— or

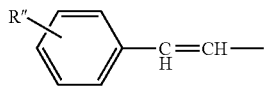

wherein:

W is H, CH$_3$, F, Cl, Br or I,

R″ is a C$_{1-6}$ alkyl group, methoxy, cyano, F, Cl, Br or I.

Sp is a C$_{1-22}$ branched or straight-chain alkylene group, in which one or more —CH$_2$— groups present in the hydrocarbon chain may be replaced, independently, by one or more groups selected from —O—, —CH(OH)—, —SO$_2$—, —COO—, —OCO—, —OCO—O—, —CH=CH—, —C≡C—, —(CF$_2$)$_r$—, with the proviso that no two oxygen atoms are directly linked to each other. The integer r is a number between 1 and 10, k is 1, X is —O—, —CO—, —COO—, —OCO—, —CH=CH—, —C≡C—, or a single bond, more preferably —O—, —COO—, —OCO— or a single bond, t is 1.

One of A$^1$ to A$^4$ may also be, branched or straight, a C$_1$-C$_{20}$-alkyl, C$_1$-C$_{20}$-alkoxy, C$_1$-C$_{20}$-alkoxycarbonyl, C$_1$-C$_{20}$-alkylcarbonyl or C$_1$-C$_{20}$-alkylcarbonyloxy group, for example methyl, ethyl, propyl, butyl, pentyl, hexyl, heptyl, octyl, nonyl, decyl, undecyl, dodecyl, methoxy, ethoxy, n-propoxy, isopropoxy, butoxy, pentyloxy, hexyloxy, heptyloxy, octyloxy, nonyloxy, decyloxy, undecyloxy, dodecyloxy, methoxycarbonyl, ethoxycarbonyl, propoxycarbonyl, butoxycarbonyl, pentyloxycarbonyl, hexyloxy-carbonyl, octyloxycarbonyl, nonyloxycarbonyl, decyloxycarbonyl, undecyloxycarbonyl, dodecyloxycarbonyl, acetyl, propionyl, butyryl, valeryl, hexanoyl, heptanoyl, octanoyl, nonanoyl, decanoyl, undecanoyl, dodecanoyl, terdecanoyl, acetoxy, propionyloxy, butyryloxy, valeryloxy, hexanoyloxy, heptanoyloxy, octanoyloxy, nonanoyloxy, decanoyloxy, undecanoyloxy, dodecanoyloxy, terdecanoyloxy and the like; with the proviso that at least one of A$^1$ to A$^4$ comprises a branched C$_3$-C$_{16}$ alkyl (or alkylene) group and/or one of A$^1$ to A$^4$ comprises at least one ester group, preferably an oxocarbonyl or carbonyloxy group.

C$^1$ to C$^4$ are preferably selected from:

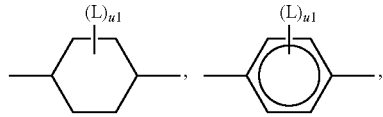

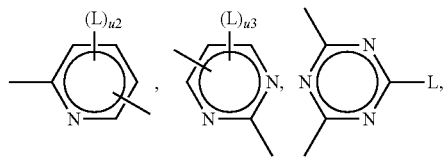

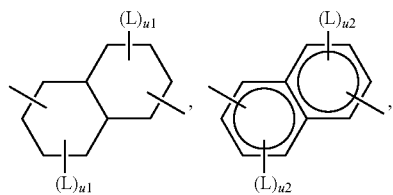

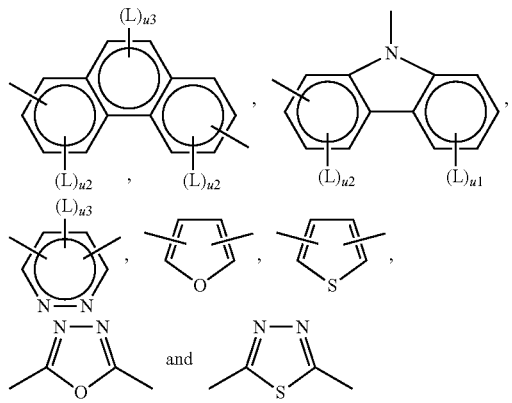

wherein:

L being —CH$_3$, —COCH$_3$, —NO$_2$, —CN or halogen, u1 is 0, 1, 2, 3, or 4, u2 is 0, 1, 2, or 3, u3 is 0, 1, or 2.

Further preferred compounds are compounds of formula (I), wherein:

C$^1$ to C$^4$ are selected from optionally substituted cyclohexyl or cyclohexylene, phenyl or phenylene, naphthyl or naphthylene or phenanthryl or phenanthrylene, A$^1$ to A$^4$ independently from each other is hydrogen, a polar group such as cyano, nitro, a halogen, or a group of formula (II)

in which:

P is hydrogen or a polymerizable group such as CH$_2$=CW—, CH$_2$=CW—O—, CH$_2$=CW—COO— or

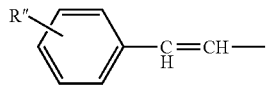

wherein:
W is H, CH$_3$, F, Cl Br or I,
R" is a C$_{1-6}$ alkyl group, methoxy, cyano, F, Cl, Br or I,
Sp is a C$_{1-22}$ branched or straight-chain alkylene group, in which one or more —CH$_2$— groups present in the hydrocarbon chain may be replaced, independently, by one or more groups selected from —O—, —CH(OH)—, —SO$_2$—, —COO—, —OCO—, —OCO—O—, —CH=CH—, —C≡C—, —(CF$_2$)$_r$—, with the proviso that no two oxygen atoms are directly linked to each other. The integer r is an number between 1 and 10,
k is 1,
X is —O—, —CO—, —COO—, —OCO—, —CH=CH—, —C≡C—, or a single bond, more preferably —O—, —COO—, —OCO— or single bond,
t is 1,
with the proviso that at least one of A1 to A4 comprises a polymerizable group such as CH$_2$=CW—, CH$_2$=CW—O—, CH$_2$=CW—COO— or

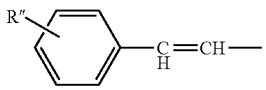

wherein:
W is H, CH$_3$, F, Cl, Br or I,
R" is a C$_{1-6}$ alkyl group, methoxy, cyano, F, Cl, Br or I.
Further preferred compounds are compounds of formula (I), wherein:
A$^1$ comprises a polymerizable group such as CH$_2$=CW—, CH$_2$=CW—O—, CH$_2$=CW—COO—,
wherein:
W is H or CH$_3$,
A$^2$ has the meaning of formula (II), P-(Sp)$_k$-(X)$_t$— (II)

wherein:
P is hydrogen or a polymerizable group such as as CH$_2$=CW—, CH$_2$=CW—O— or CH$_2$=CW—COO—, wherein:
W is H or CH$_3$,
Sp is a branched C$_3$-C$_{16}$ alkylene group, optionally comprising at least one oxocarbonyl or carbonyloxy group, or is a straight C$_2$-C$_{16}$ alkylene group, comprising at least one oxocarbonyl or carbonyloxy group, wherein one or more —CH$_2$— groups present in the hydrocarbon chain may be replaced, independently, by one or more groups selected from —O—, —CH=CH—, —C≡C—, with the proviso that no two oxygen atoms are directly linked to each other,
k is 1,
X is —O—, —CO—, —COO—, —OCO—, —CH=CH—, —C≡C—, or a single bond, more preferably —O—, —COO—, —OCO— or a single bond,
t is 1
A$^4$ is hydrogen.
Further preferred compounds are compounds of formula (I), wherein:
A$^1$ has the meaning of formula (II), P-(Sp)$_k$-(X)$_t$— (II)

wherein:
P is hydrogen or a polymerizable group such as CH$_2$=CW—, CH$_2$=CW—O— or CH$_2$=CW—COO—, wherein:
W is H or CH$_3$,
Sp is a branched C$_3$-C$_{16}$ alkylene group, optionally comprising at least one oxocarbonyl or carbonlyoxy group, or is a straight C$_2$-C$_{16}$ alkylene group, comprising at least one oxocarbonyl or carbonyloxy group, wherein one or more —CH$_2$— groups present in the hydrocarbon chain may be replaced, independently, by one or more groups selected from —O—, —CH=CH—, —C≡C—, with the proviso that no two oxygen atoms are directly linked to each other,
k is 1
X is —O—, —CO—, —COO—, —OCO—, —CH=CH—, —C≡C—, or a single bond, more preferably —O—, —COO—, —OCO— or a single bond,
t is 1,
A$^2$ comprises a polymerizable group such as CH$_2$=CW—, CH$_2$=CW—O— or CH$_2$=CW—COO—,
wherein:
W is H or CH$_3$,
A$^4$ is hydrogen.
Further preferred compounds are compounds of formula (I), wherein:
A$^1$ has the meaning of formula (II), P-(Sp)$_k$-(X)$_t$— (II)

wherein:
P is hydrogen or a polymerizable group such as CH$_2$=CW—, CH$_2$=CW—O— or CH$_2$=CW—COO—, wherein:
W is H or CH$_3$,
Sp is a branched C$_3$-C$_{16}$ alkylene group, optionally comprising at least one oxocarbonyl or carbonlyoxy group, or is a straight C$_2$-C$_{16}$ alkylene group, comprising at least one oxocarbonyl or carbonyloxy group, wherein one or more —CH$_2$— groups present in the hydrocarbon chain may be replaced, independently, by one or more groups selected from —O—, —CH=CH—, —C≡C—, with the proviso that no two oxygen atoms are directly linked to each other,
k is 1,
X is —O—, —CO—, —COO—, —OCO—, —CH=CH—, —C≡C—, or a single bond, more preferably —O—, —COO—, —OCO— or a single bond,
t is 1,
A$^3$ comprises a polymerizable group such as CH$_2$=CW—, CH$_2$=CW—O—, or CH$_2$=CW—COO—,
wherein:
W is H or CH$_3$,
A$^4$ is hydrogen.
Further preferred compounds are compounds of formula (I), wherein:
A$^2$ has the meaning of formula (II), P-(Sp)$_k$-(X)$_t$— (II)

wherein:
P is hydrogen or polymerizable group such as CH$_2$=CW—, CH$_2$=CW—O— or CH$_2$=CW—COO—, wherein:
W is H or CH$_3$,
Sp is a branched C$_3$-C$_{16}$ alkylene group, optionally comprising at least one oxocarbonyl or carbonlyoxy group, or is a straight C$_2$-C$_{16}$ alkylene group, comprising at least one oxocarbonyl or carbonyloxy group, wherein one or more of —CH$_2$— groups present in the hydrocarbon chain may be replaced, independently, by one or more groups selected from —O—, —CH=CH—, —C≡C—, with the proviso that no two oxygen atoms are directly linked to each other, k is 1

X is —O—, —CO—, —COO—, —OCO—, —CH=CH—, —C≡C—, or a single bond, more preferably —O—, —COO—, —OCO— or a single bond.

t is 1,

A$^3$ comprises a polymerizable group such as CH$_2$=CW—, CH$_2$=CW—O— or CH$_2$=CW—COO—, wherein:
W is H or CH$_3$,
A$^4$ is hydrogen.

Further preferred compounds are compounds of formula (I) in which:
A$^1$ and A$^2$ have the meaning of formula (II), $$P\text{-}(Sp)_k\text{-}(X)_t— \quad (II)$$

wherein:
P is hydrogen or a polymerizable group such as CH$_2$=CW—, CH$_2$=CW—O— or CH$_2$=CW—COO—,
wherein:
W is H or CH$_3$,
Sp is a branched C$_3$-C$_{16}$ alkylene group, optionally comprising at least one oxocarbonyl or carbonlyoxy group, or is a straight C$_2$-C$_{16}$ alkylene group, comprising at least one oxocarbonyl or carbonyloxy group, wherein one or more of —CH$_2$— groups present in the hydrocarbon chain may be replaced, independently, by one or more groups selected from —O—, —CH=CH—, —C≡C—, with the proviso that no two oxygen atoms are directly linked to each other, k is 1

X is —O—, —CO—, —COO—, —OCO—, —CH=CH—, —C≡C—, or
a single bond, more preferably —O—, —COO—, —OCO— or a single bond, t is 1, A$^3$ comprises a polymerizable group such as CH$_2$=CW—, CH$_2$=CW—O— or CH$_2$=CW—COO—, wherein:
W is H or CH$_3$,
A$^4$ is hydrogen.

Further preferred compounds are compounds of formula (I) referring to any of the preceding definitions and in which at least one of A$^1$ to A$^3$ has the meaning of formula (II), $$P\text{-}(Sp)_k\text{-}(X)_t— \quad (II)$$

wherein:
P is hydrogen or a polymerizable group such as CH$_2$=CW—, CH$_2$=CW—O—, CH$_2$=CW—COO—,
wherein:
W is H or CH$_3$,
Sp has the meaning of formula (III)

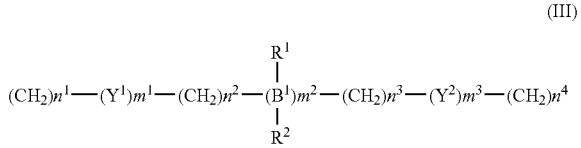

(III)

wherein:
Y$^1$ and Y$^2$ each independently represent —OCO— or —COO—,
B$^1$ represents C or CH,
R$^1$ and R$^2$ each independently represent hydrogen or a C$_1$-C$_{12}$ alkyl residue, preferably a C$_1$-C$_6$ alkyl residue, such as
a methyl, ethyl, propyl, butyl, pentyl, hexyl or isopropyl residue, n1, n2, n3 and n4 are independently integers from 0 to 15, such that 0≦n1+n2+n3+n4≦15,
m1, m2 and m3 are independently integers from 0 to 3, such that 1≦m1+m2+m3≦3.
One or more —CH$_2$— groups present in the hydrocarbon chain of (III) may be replaced, independently, by one or more groups selected from —O—, —CH=CH— or —C≡C—,
with the proviso that the carbon-carbon double bond of P is not directly connected to the carbon atom of Y$^1$ or Y$^2$, k is 1, X is —O—, —CO—, —COO—, —OCO—, —CH=CH—, —C≡C—, or a single bond, more preferably —O—, —COO—, —OCO— or a single bond, t is 1.

Further preferred compounds are compounds of formula (I) referring to any of the preceding definitions and in which at least one of A$^1$ to A$^3$ has the meaning of formula (II), $$P\text{-}(Sp)_k\text{-}(X)_t— \quad (II)$$

wherein:
P is hydrogen or a polymerizable group such as CH$_2$=CW—, CH$_2$=CW—O—, CH$_2$=CW—COO—,
wherein:
W is H or CH$_3$,
Sp has the meaning of formula (III)

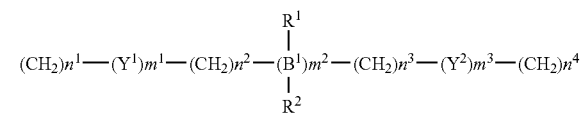

(III)

wherein:
Y$^1$ and Y$^2$ each independently represent —OCO— or —COO—,
B$^1$ represents C or CH,
R$^1$ is hydrogen,
R$^2$ represents a methyl, ethyl, propyl, butyl, pentyl or hexyl group and most preferably a methyl or ethyl group,
n1, n2, n3 and n4 are independently integers from 0 to 15, such that 0≦n1+n2+n3+n4≦15,
m1, m2 and m3 are independently integers from 0 to 3, such that 1≦m1+m2+m3≦3.
One or more —CH$_2$— groups present in the hydrocarbon chain of (III) may be replaced, independently, by one or more groups selected from —O—, —CH=CH— or —C≡C—,
with the proviso that the carbon-carbon double bond of P is not directly connected to the carbon atom of Y$^1$ or Y$^2$, k is 1, X is —O—, —CO—, —COO—, —OCO—, —CH=CH—, —C≡C—, or a single bond, more preferably —O—, —COO—, —OCO— or a single bond, t is 1.

The compounds of the invention may readily be prepared using methods that are well known to the person skilled in the art, such as those documented in Houben-Weyl, *Methoden*

*der Organischen Chemie*, Thieme-Verlag, Stuttgart. The compounds may for example be made according to the reaction schemes given below, in which the following abbreviations are used:
DIAD is Diisopropyl azodicarboxylate
TPP is Triphenylphosphine
THF is Tetrahydrofurane
DMF is N,N-Dimethylformamide
$Et_3N$ is Triethylamine
BTSS is Bis-trimethyl-silyl-sulfate
DBU is 1,8-Diazabicyclo[5.4.0]undec-7-en(1,5-5)
EDC is N-(3-dimethylaminopropyl)-N'-ethylcarbodiimide hydrochloride
DMAP is 4-Dimethylaminopyridine
$(PPh_3)_2PdCl_2$ is Bis-triphenylphosphine palladium dichloride
$(PPh_3)_4Pd$ is Tetrakis-triphenylphosphine palladium
PPTS is Pyridinum p-toluenesulfonate
DCC is 1,3-Dicyclohexylcarbodiimide
DEAD is Diethylazodicarbonate
HMPT is Hexamethylphosphorous triamide Scheme 1:

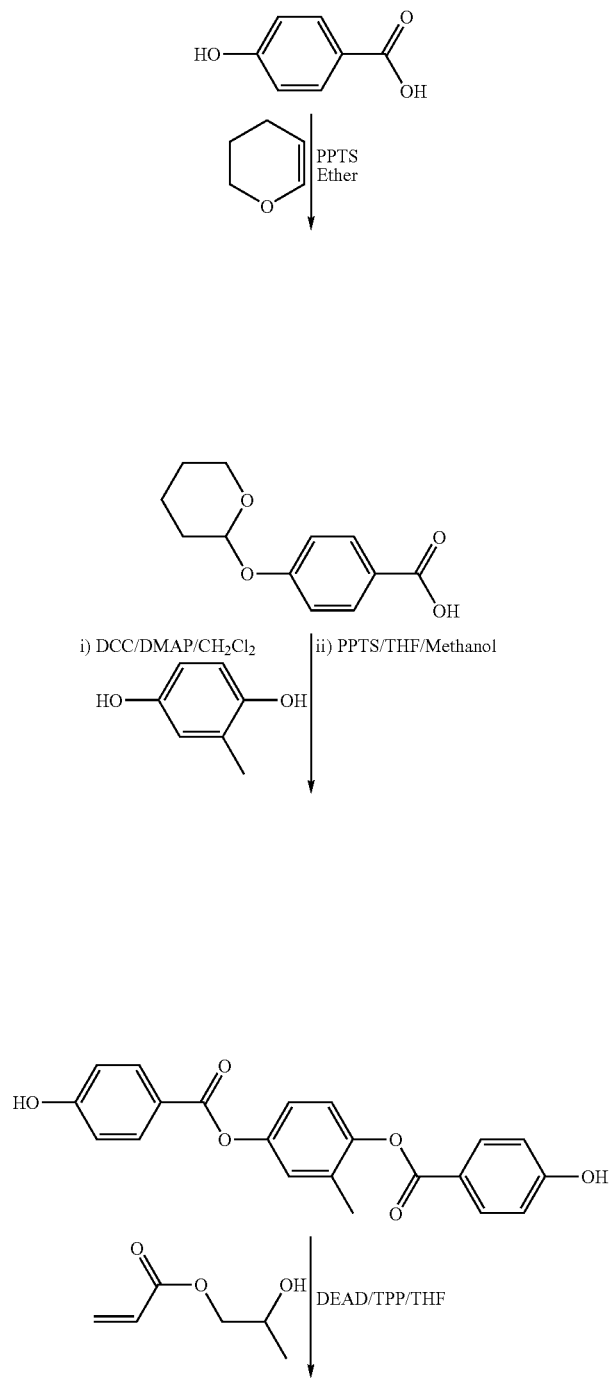

15
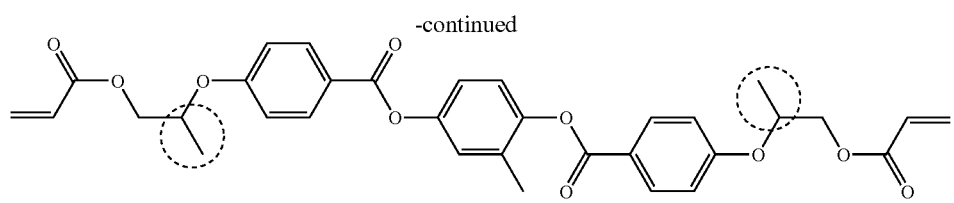
16
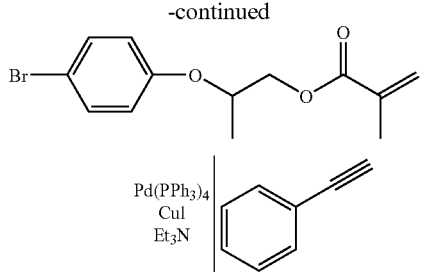
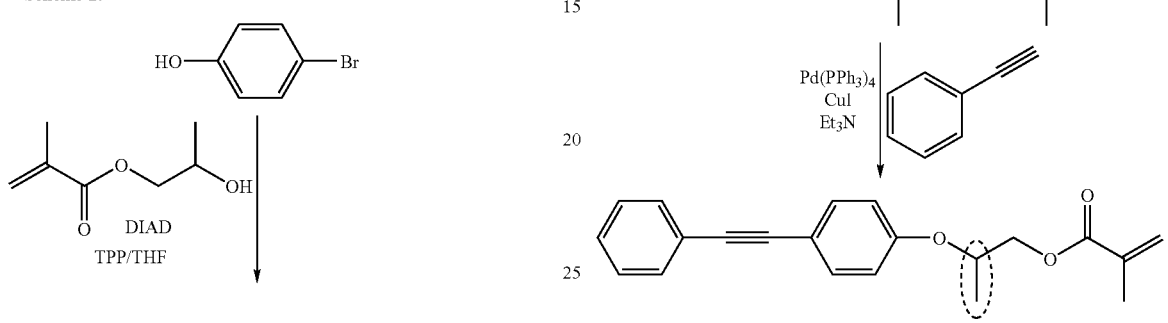
Scheme 2:
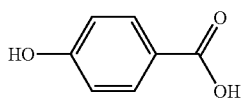
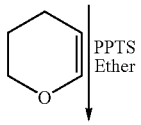
Scheme 3:
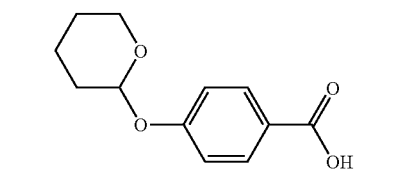
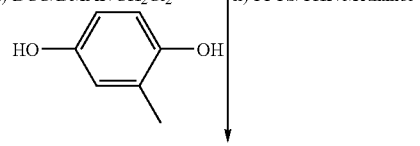

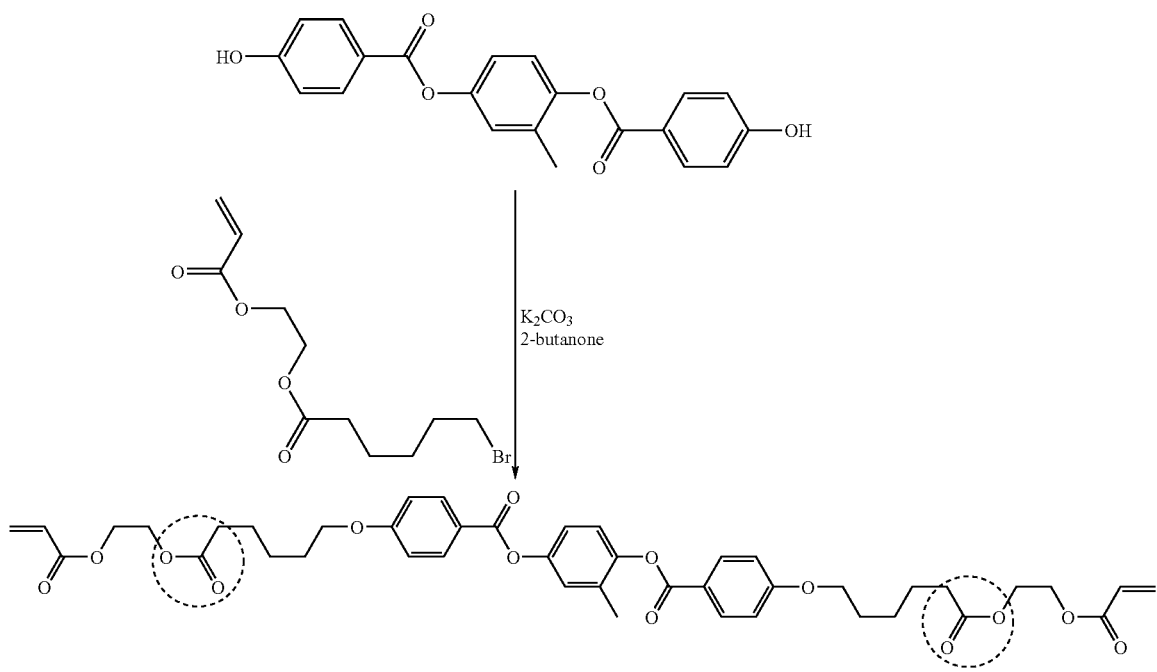
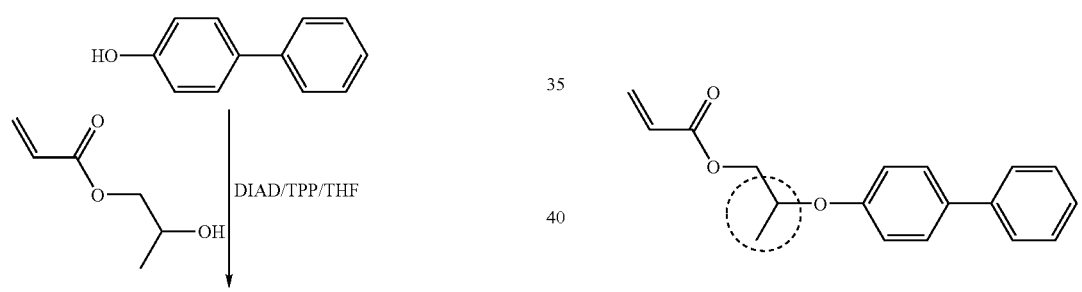
Scheme 4:
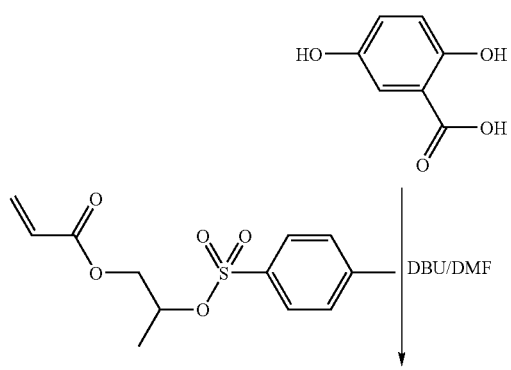
Scheme 5:

-continued
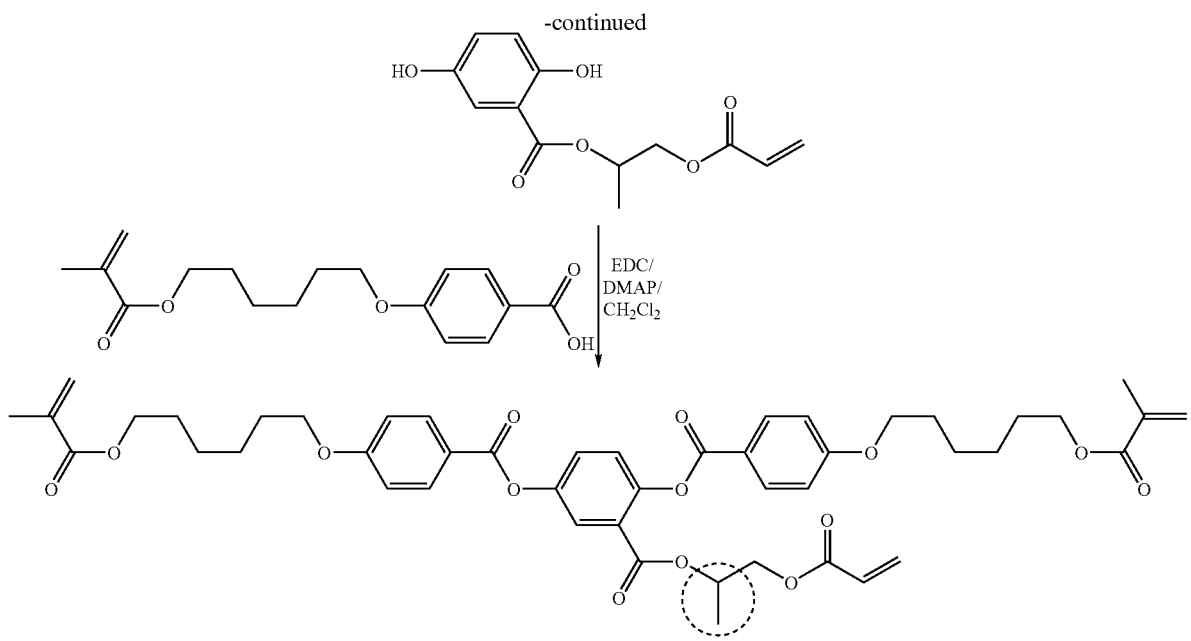
Scheme 6:
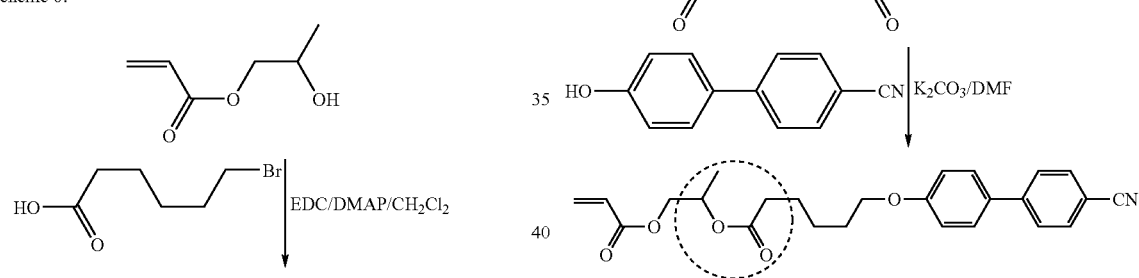
Scheme 7:
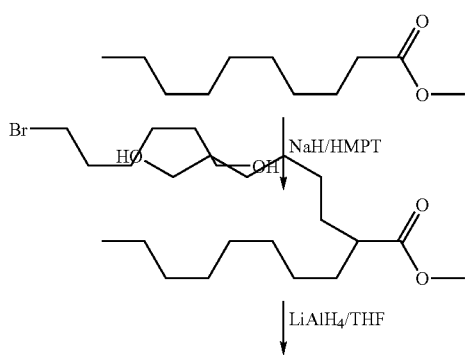

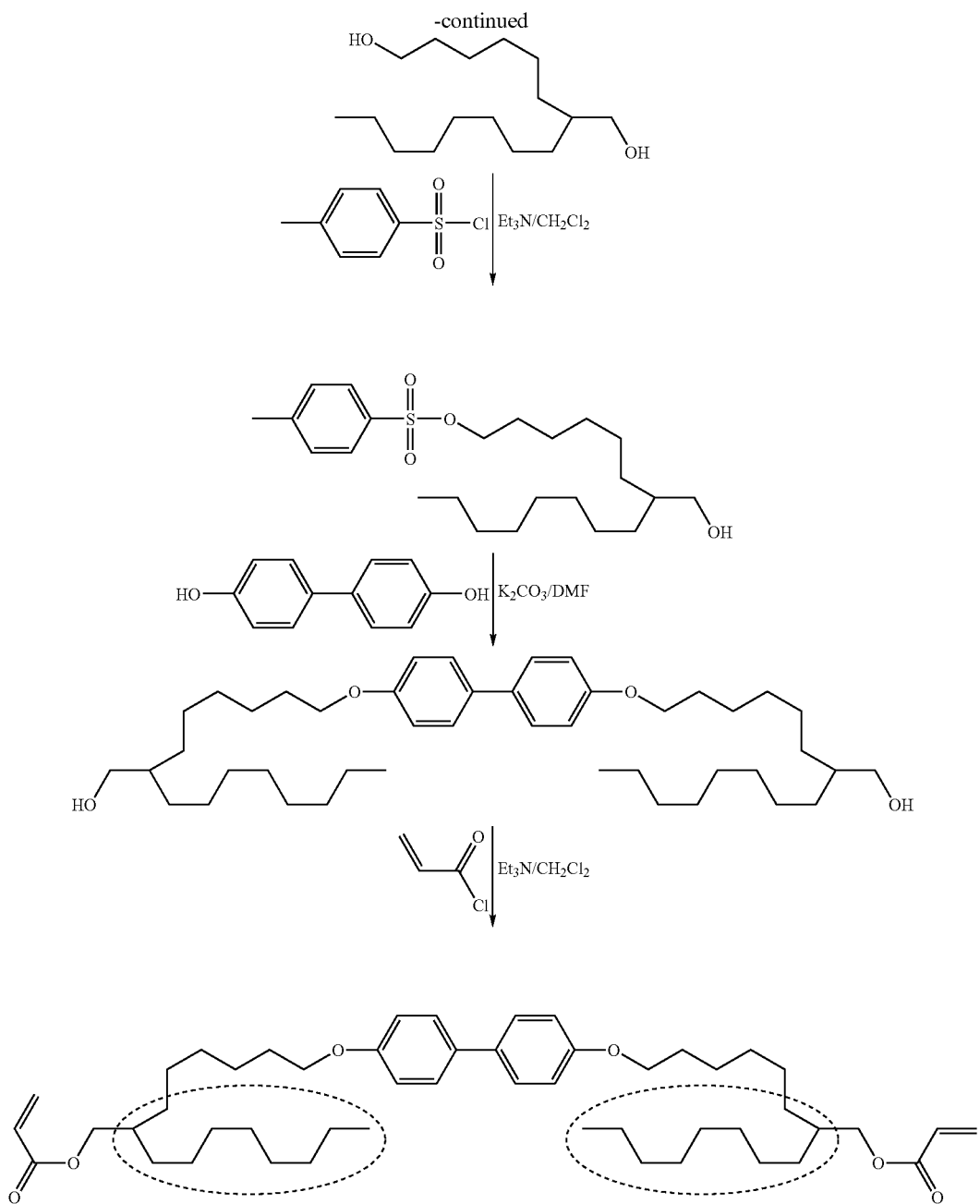
Scheme 8:
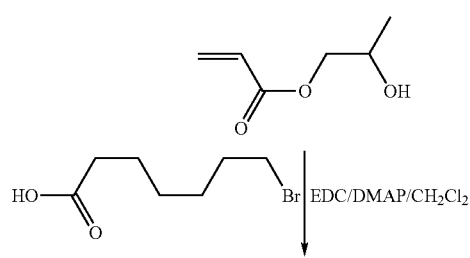

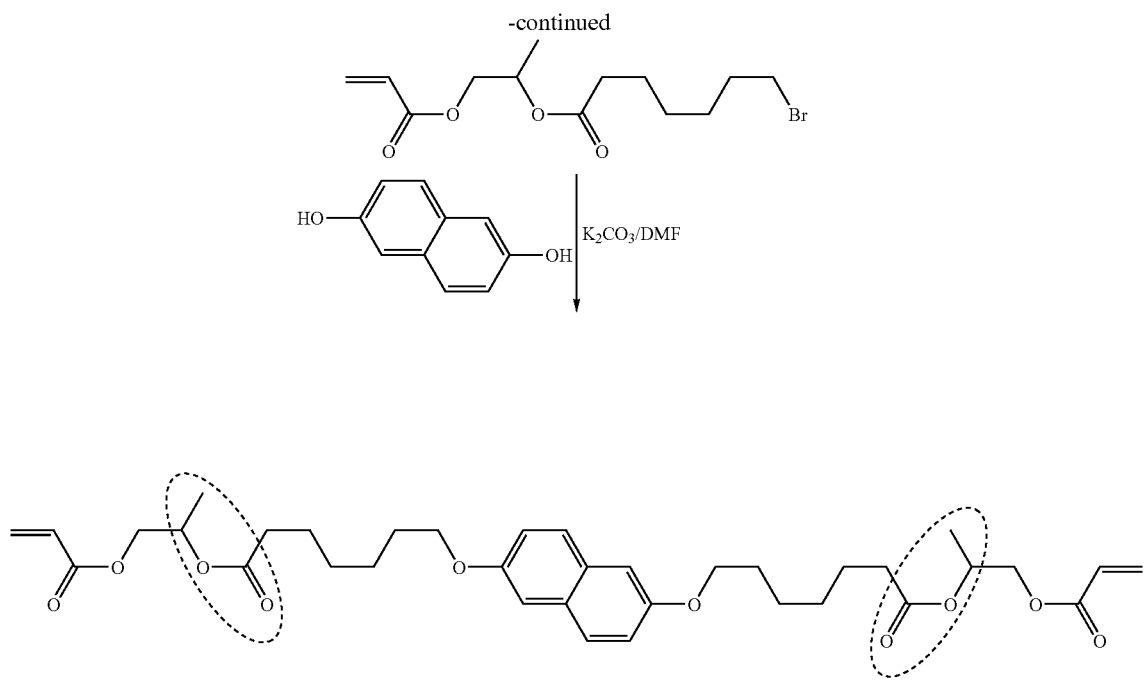
Scheme 9:
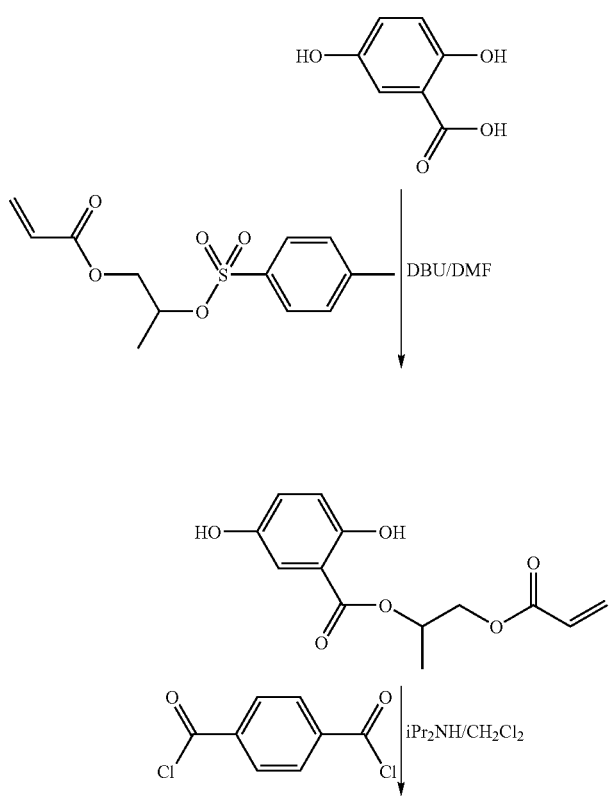

25 26
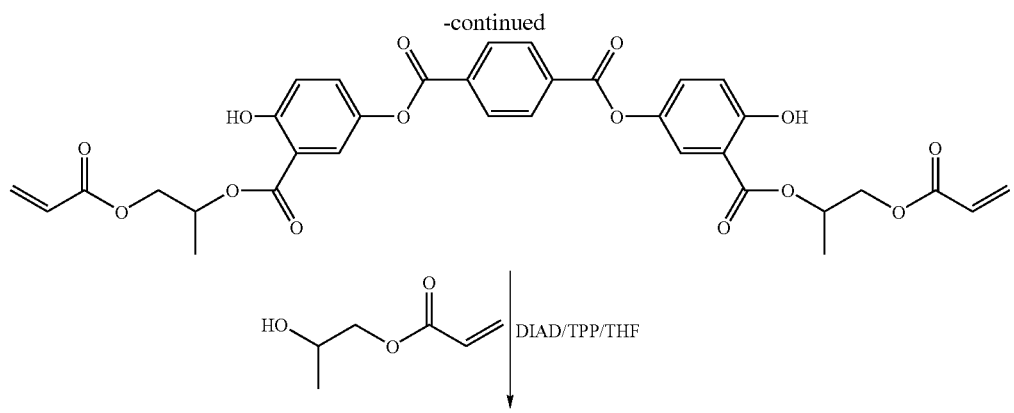
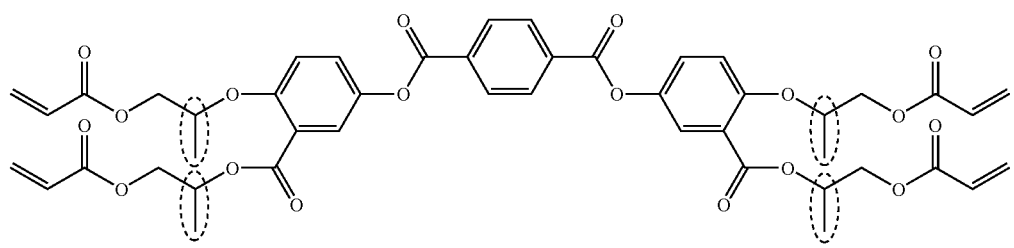
Scheme 10:
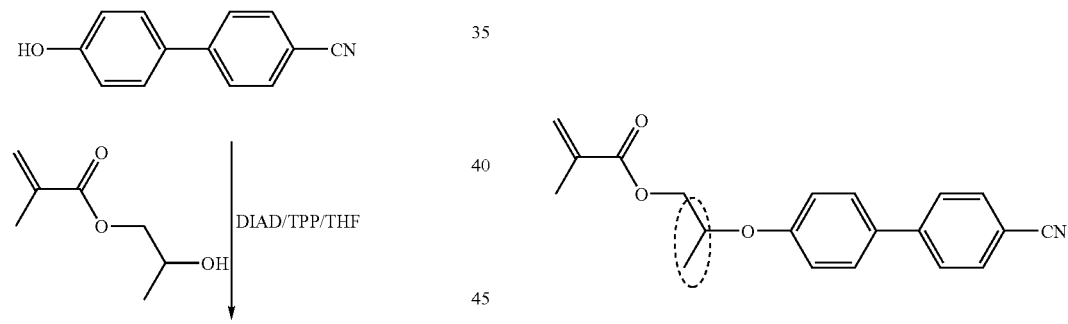
Scheme 11:
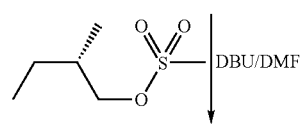
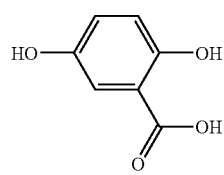

-continued
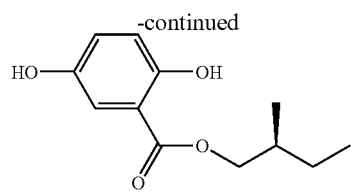
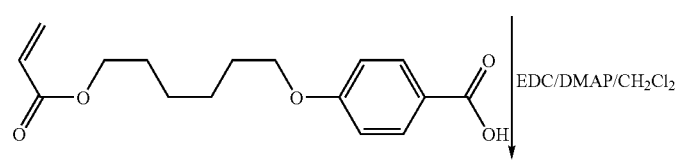
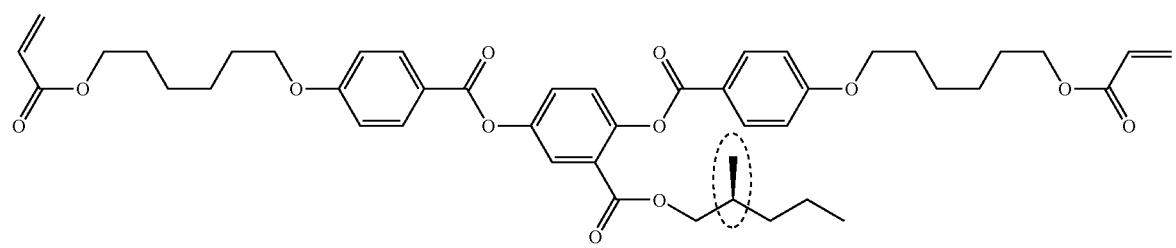
Scheme 12:
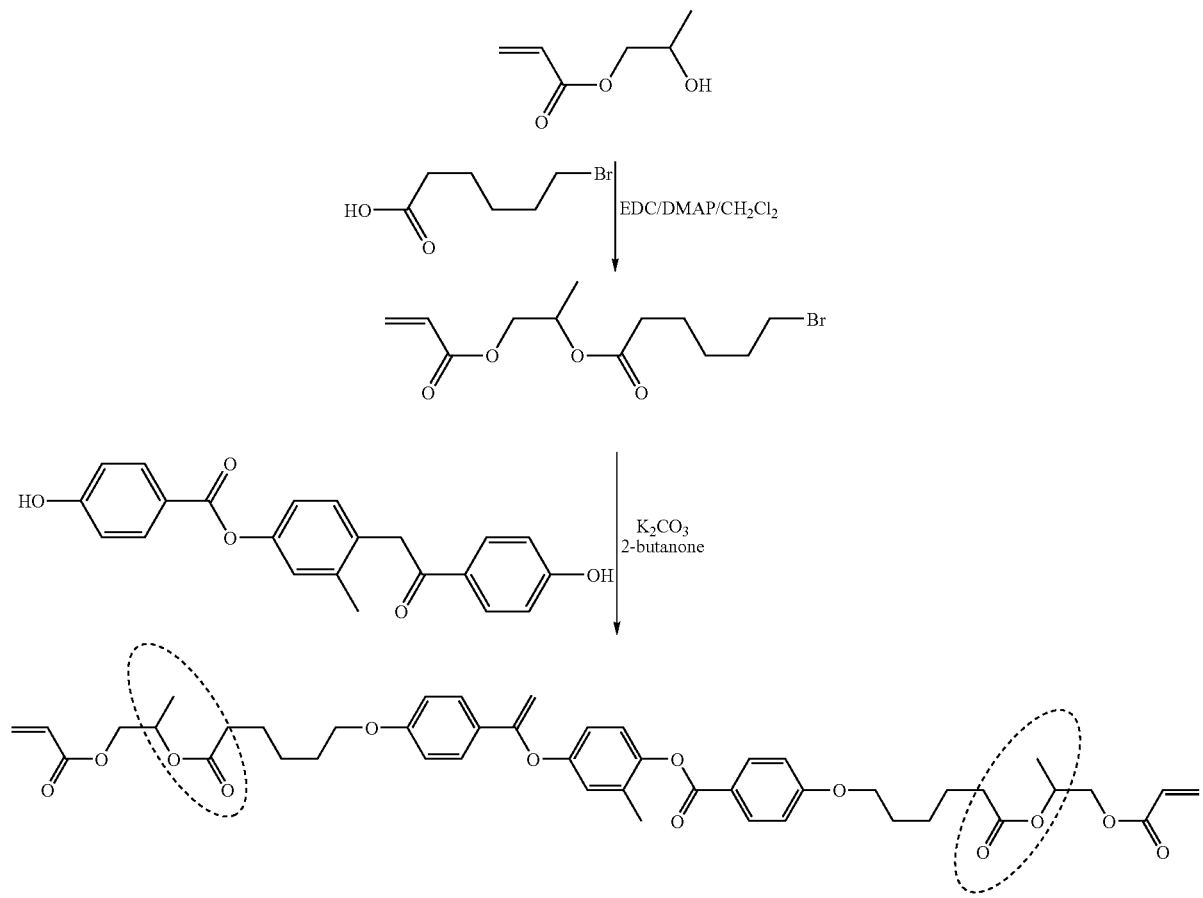

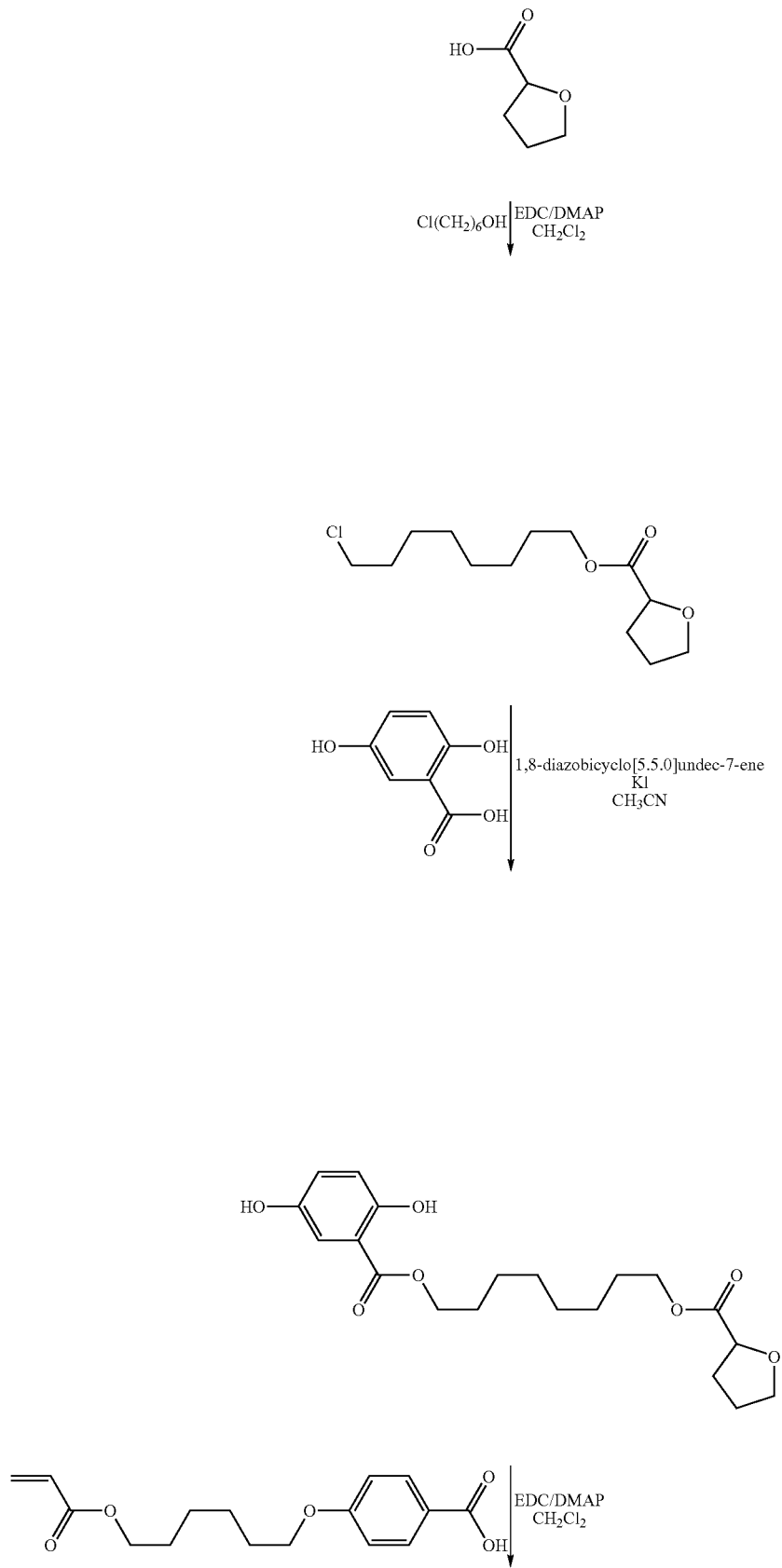
Schema 13

31 32
-continued
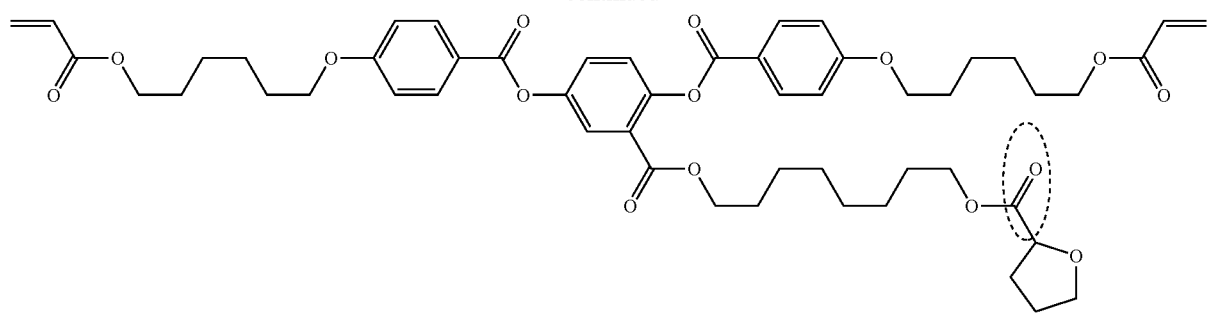
Scheme 14:
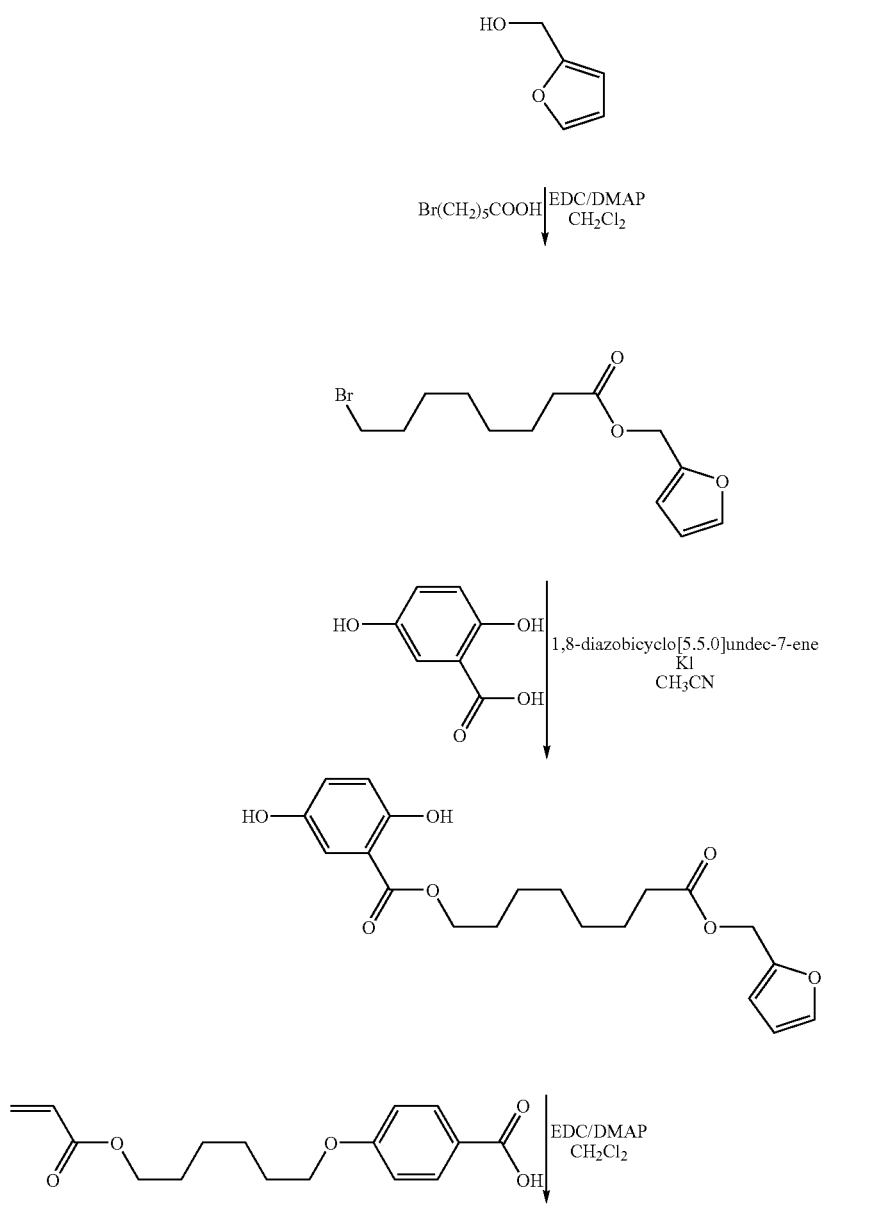

33     34
-continued
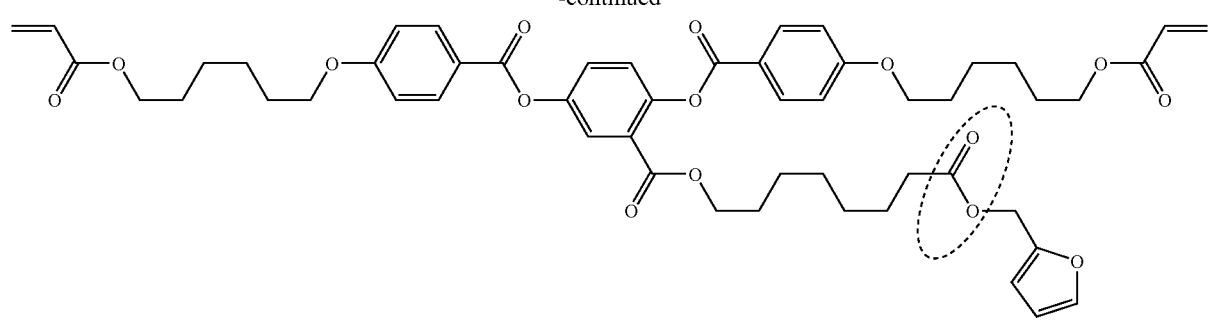
Scheme 15:
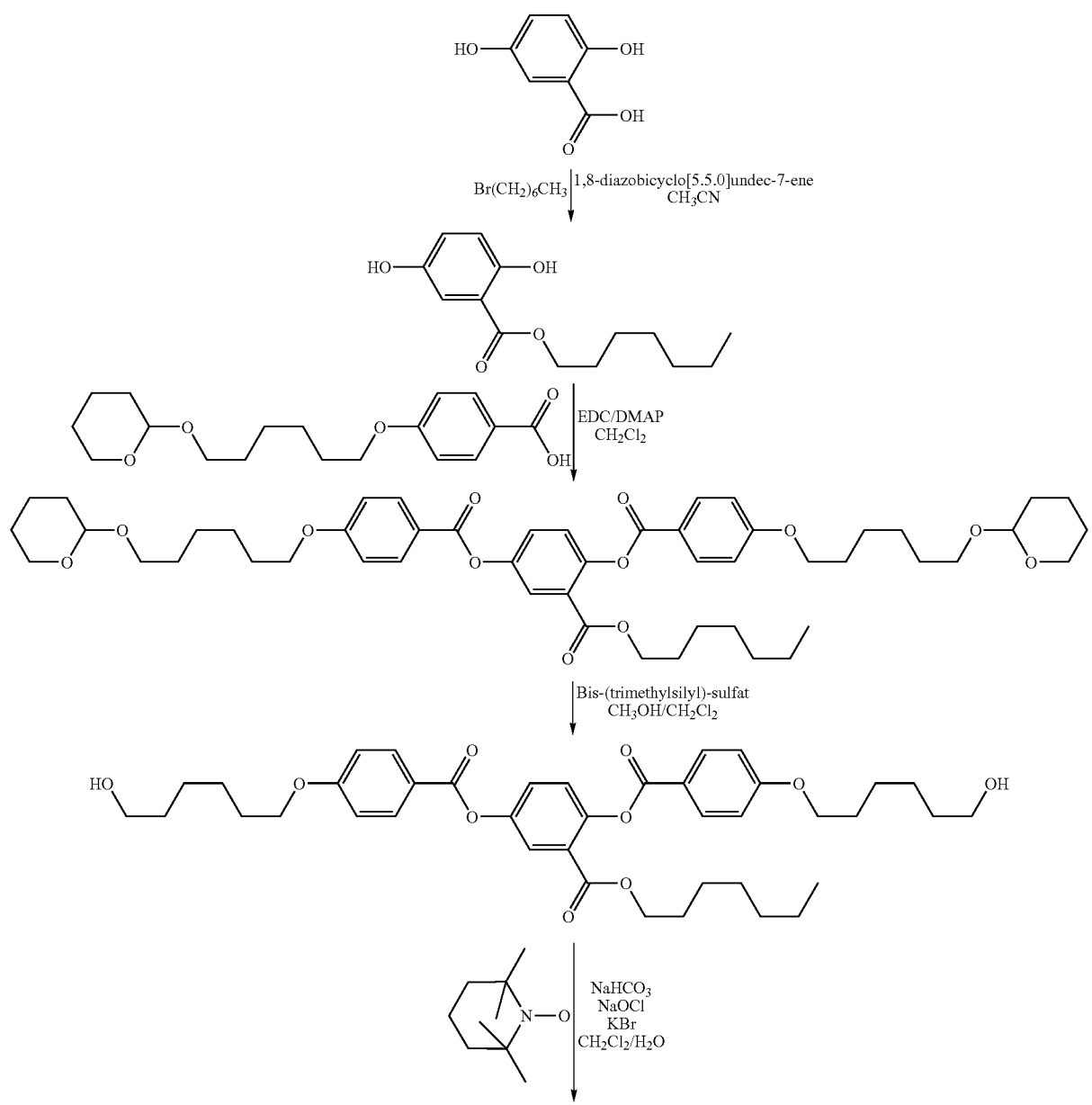

-continued

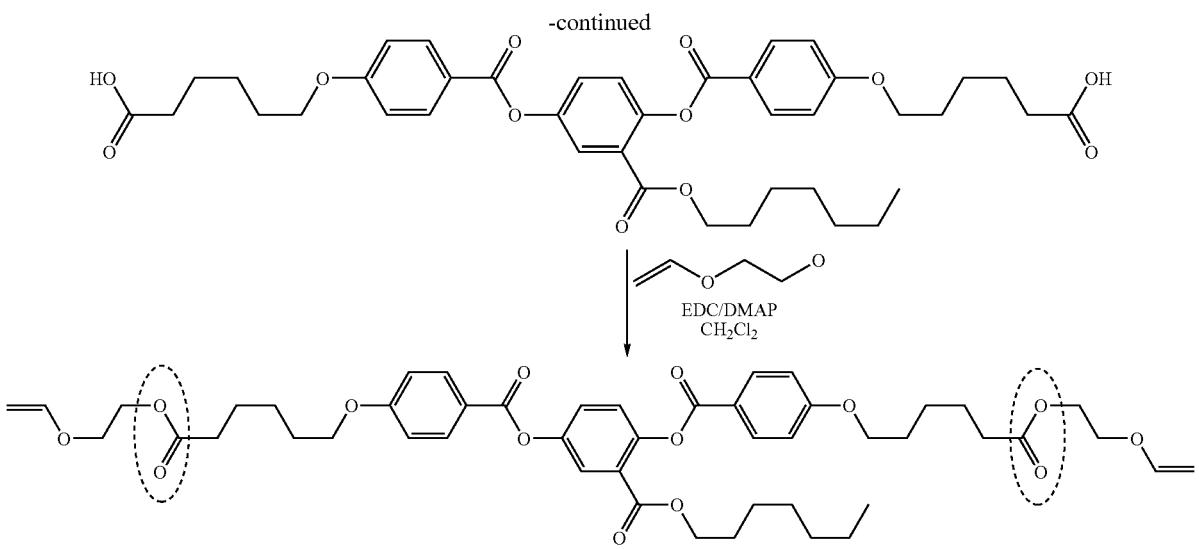

Cross-linkable liquid crystalline compounds which may be used as components of polymerizable liquid crystalline mixtures together with compounds according to the invention are well known to the skilled person. Suitable compounds are described e.g. in patent publications EP 0 331 233, WO 95/24454, U.S. Pat. No. 5,567,349, U.S. Pat. No. 5,650,534, WO 00/04110, WO 00/07975, WO 00/48985, WO 00/55110, WO 00/63154.

At least one of the cross-linkable liquid crystalline compounds used in the mixtures comprising an additive component according to the invention possesses at least one polymerizable group in the chemical structure in order to enable cross-linking. For improving the cross-linking capacity the addition of compounds incorporating two or more polymerizable groups, so called cross-linkers, may also be considered. Furthermore, known stabilizing agents such as e.g. phenol derivatives for stabilization purposes may be added. Furthermore initiators like e.g. Irgacure® are in general part of the reaction mixture.

The appropriate form of the liquid crystalline material will depend upon the application for which it is to be used and may be present as a liquid crystalline mixture, (co)polymer, elastomer, polymer gel or polymer network. Polymer networks have been found to be of particular use and in a further preferred embodiment of the invention there is a polymer network provided comprising one or more compound(s) of formula (I). The polymer network comprises at least two components, at least one of which is an additive component of formula (I).

The polymer network may be prepared by polymerization of a mesogenic mixture comprising:
i) one or more chiral and/or achiral mesogenic polymerizable compounds
ii) one or more chiral and/or achiral additive components of formula (I)
iii) an initiator
iv) optionally one or more chiral additives
v) optionally one or more dyes
vi) optionally one or more cross-linkers
vii) optionally one or more stabilizers
viii) optionally one or more plasticizers The chiral or achiral mesogenic polymerizable compounds may be selected from known mesogenic materials such as from those referred to above and also from other mesogenic materials. Preferably the chiral or achiral polymerizable compounds include the nematic phase in their thermotropic sequence.

The polymer network may optionally comprise further components. As outlined above this may include further polymerizable compounds, stabilizers and dyes. The further polymerizable compounds may be plasticizers having at least one polymerizable functional group, or cross-linkers having at least one polymerizable functional group, especially diacrylate groups.

Any suitable stabilizer that prevents undesired spontaneous polymerisation, for example during storage of the mixture, may be used in the liquid crystalline mixture according to the invention. A broad range of these compounds is commercially available. Typical examples include 4-ethoxyphenol or 2,6-di-tert-butyl-4-methylphenol (BHT).

If color filters are required, dyes may be added to the mixture. In a preferred embodiment of the invention the liquid crystalline polymer mixture contains no dye.

The chiral or achiral polymerizable, cross-linkable mesogenic compound(s) may be present in an amount of 0.01 to 99% by weight of the liquid crystalline polymer mixture, preferably 50 to 95% by weight.

The additive component(s) of formula (I) may be present in an amount of 0.1 to 50% by weight of the liquid crystalline polymer mixture, preferably in an amount of 1 to 30% by weight, even more preferably in an amount of 1 to 10% by weight.

The initiator is preferably a photo-initiator and may be a radical or cationic initiator that is present in an amount of 0.1 to 5% by weight of the liquid crystalline polymer mixture, preferably in an amount of 0.2 to 2% by weight.

In case the cross-linkable liquid crystalline compound mixture further comprises a stabilizer, the latter is generally present in an amount of 0.01 to 5% by weight of the liquid crystalline mixture, preferably in an amount of 0.1 to 1% by weight.

These cross-linkable, polymerizable liquid crystalline mixtures may be formed into liquid crystalline polymer (LCP) films and a further aspect of the invention provides an LCP film comprising a compound of formula (I). LCP films may be readily prepared by UV polymerization of a liquid crystalline polymer mixture according to the invention: a film comprising the liquid crystalline mixture according to the invention is formed on a substrate and polymerized using UV light to give a cross-linked liquid crystalline polymer (LCP) film. The film is resistant when exposed to light and temperature and can be used in the manufacture of devices such as waveguides, optical gratings, filters, retarders, polarizers, piezoelectric cells or thin films exhibiting non-linear optical properties.

Different methods can be used for the formation of the desired LCP networks, starting from the polymerizable liquid crystalline mixtures as described above. Transparent substrates such as glass or plastic substrates, coated with indium tin oxide (ITO) may be used. For the preparation of LCP films, it is particularly important to avoid the formation of defects or inhomogenities. Thus preferred substrates include glass or plastic, especially those including a layer of rubbed polyimide or polyamide or a layer of photo-oriented photopolymers (LPP). Said layers are used to facilitate uniform orientation of the liquid crystalline mixture. Uniform orientation can also be achieved by forming the polymerizable liquid crystalline mixture into a thin film using standard coating methods known per se on the aforementioned substrates and shearing the obtained film over a small distance or over the coated distance until a homogeneous orientation is obtained; or by capillary filling the polymerizable liquid crystalline mixture between two of said substrates; prior to curing, for example by UV light, preferably in the presence of a photo-initiator, such as Irgacure®.

A further aspect of the invention provides an unstructured or structured optical or electro-optical component and multi-layer systems comprising a polymer network or a liquid crystalline polymer film comprising a compound of formula (I). The optical or electro-optical component may be a waveguide, an optical grating, a filter, a retarder, a piezoelectric cell or a non-linear optical cell or film.

In the following the invention will now be described with reference to Examples 1 to 11. Variations of these examples falling within the scope of the invention will be apparent to a person skilled in the art.

The abbreviation $T_{iso}$ used herein below means the temperature at which the transition to the isotropic state occurs.

EXAMPLE 1

Preparation of Additive No. 1

(D,L)-{4-{[4-({6-[2-(acryloyloxy)-1-methylethoxy]-6-oxohexyl}oxy)benzoyl]oxy}-2-methylphenyl 4-({6-[2-(acryloyloxy)-1-methylethoxy]-6-oxohexyl}oxy)benzoate a) 4-(tetrahydro-2H-pyran-2-yloxy)benzoic acid

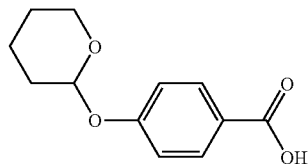

To an ice-cooled mixture of 4-hydroxybenzoic acid (13.81 g) in 250 ml of diethylether containing 1.98 g of pyridinium p-toluenesulphonic acid, 3,4-dihydro-2H-pyran (16 g) was drop wise added. After complete addition stirring was continued at temperature below +8° C. for 4 h and the white precipitate was filtered off, washed twice with 100 ml of +4° C. pre-cooled diethylether and dried to give nearly pure 4-(tetrahydro-2H-pyran-2-yloxy)benzoic acid as white powder.

Yield: 15 g.

b) 4-[(4-hydroxybenzoyl)oxy]-2-methylphenyl 4-hydroxybenzoate

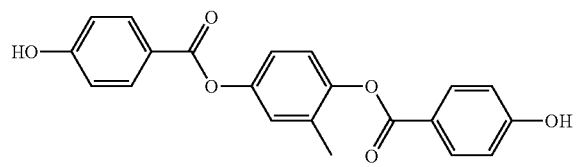

To a solution of 4-(tetrahydro-2H-pyran-2-yloxy)benzoic acid (4.44 g), 2-methylbenzene-1,4-diol (1.2 g) and DMAP (0.12 g) in 100 ml of $CH_2Cl_2$, EDC (4 g) was added. After being stirred for 6 h at room temperature, the reaction mixture was filtered over a short silica gel column using $CH_2Cl_2$ as eluent. The obtained filtrate was evaporated to dryness, then refluxed in a mixture of THF and methanol (15 ml/70 ml) in the presence of 0.4 g of pyridinium p-toluene sulfonate for 4 h. The reaction mixture was then quenched with 3 g of $NaHCO_3$, filtered over 20 g celite and evaporated to dryness. The obtained white solid was stirred in a mixture of ethanol/HCl (2N) for 30 min then filtered off, washed with water and dried. This gives nearly pure 4-[(4-hydroxybenzoyl)oxy]-2-methylphenyl 4-hydroxybenzoate as white powder.

Yield: 4.8 g.

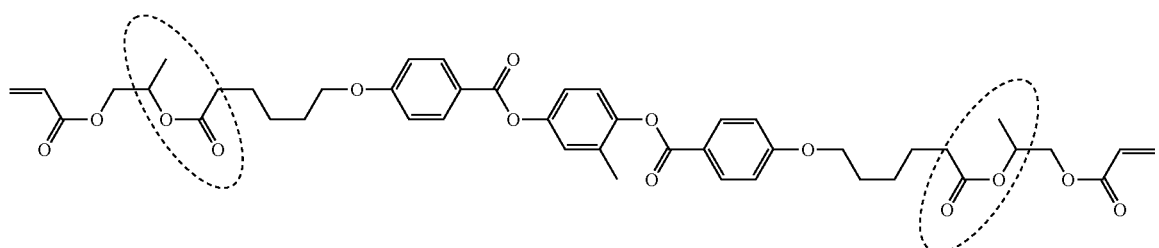

c) 2-[(6-bromohexanoyl)oxy]propyl acrylate

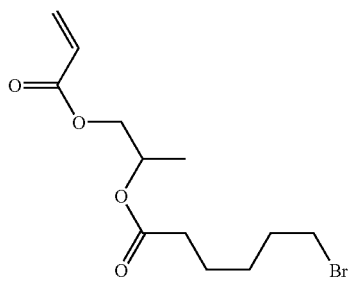

To a 0° C. cooled mixture of 6-bromohexanoic acid (9.89 g), 2-hydroxypropyl acrylate (6 g), in CH$_2$Cl$_2$ (30 ml), EDC (7.89 g) was added. After being stirred for 30 min the reaction mixture was diluted with additional 20 ml of CH$_2$Cl$_2$ and stirring was continued for 16 h at room temperature. It was then filtered over celite and the filtrate was evaporated to dryness. The obtained beige-yellow residue was purified by silica column chromatography to give nearly pure material as transparent oil.

Yield: 7.6 g.

d) 4-{[4-({6-[2-(acryloyloxy)-1-methylethoxy]-6-oxohexyl}oxy)benzoyl]oxy}-2-methylphenyl 4-({6-[2-(acryloyloxy)-1-methylethoxy]-6-oxohexyl}oxy)benzoate; Additive No. 1

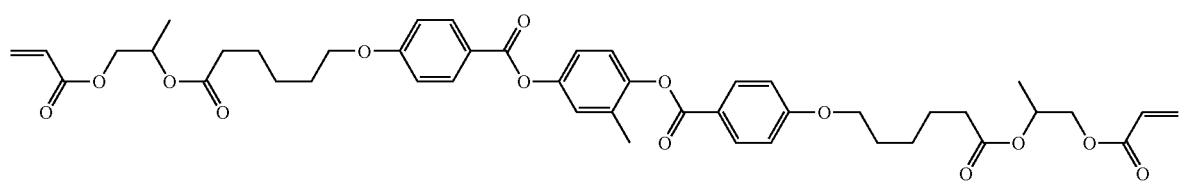

A mixture of 2-[(6-bromohexanoyl)oxy]propyl acrylate (4.15 g), 4-[(4-hydroxybenzoyl)oxy]-2-methylphenyl 4-hydroxybenzoate (2.24 g) and K$_2$CO$_3$ (2.55 g) in 2-butanone (40 ml) was heated at 100° C. overnight. The reaction mixture was poured into HCl 1N (50 ml) and extracted twice with 80 ml of diethylether. The etheral extracts were dried over Na$_2$SO$_4$ and evaporated to dryness. The obtained pasty residue was purified by silica column chromatography to give nearly pure 4-{[4-({6-[2-(acryloyloxy)-1-methylethoxy]-6-oxohexyl}oxy)benzoyl]oxy}-2-methylphenyl 4-({6-[2-(acryloyloxy)-1-methylethoxy]-6-oxohexyl}oxy)benzoate as slightly yellow oil.

Yield: 1.34 g $T_{iso}$: −38.2° C.

EXAMPLE 2

Preparation of Additive No. 2

(R,S)-2-[(4'-cyano-1,1'-biphenyl-4-yl)oxy]propyl 2-methylacrylate

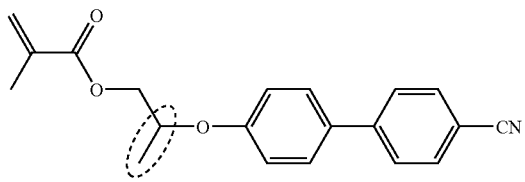

To a −25° C. cooled mixture of 4'-hydroxy-1,1'-biphenyl-4-carbonitrile (1.95 g), 2-hydroxypropyl 2-methylacrylate (1.45 g) and triphenyl phosphine (2.63 g) in 15 ml of THF, a solution of DIAD (2.03 g) in 5 ml of THF was drop wise added. After complete addition (15 min) the reaction mixture was gradually allowed to reach room temperature and stirring was maintained for further 8 h. The obtained reaction mixture was then evaporated to dryness and the obtained orange residue was purified by silica gel column chromatography. This gives pure 2-[(4'-cyano-1,1'-biphenyl-4-yl)oxy]propyl 2-methylacrylate as transparent oily material.

Yield: 2.4 g.

$T_{iso}$: −28.3° C.

EXAMPLE 3

Preparation of Additive No. 3

(2S)-2-methylbutyl 2,5-bis[(4-{[6-(acryloyloxy)hexyl]oxy}benzoyl)oxy]benzoate

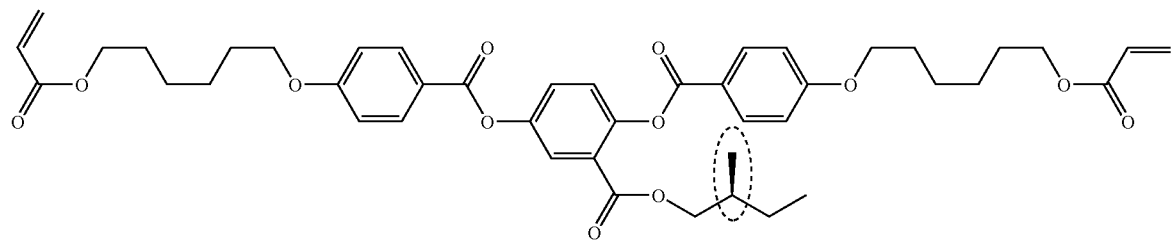

a) (2S)-2-methylbutyl methanesulfonate

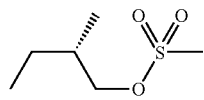

To a −25° C. cooled solution of (2S)-2-methylbutan-1-ol (8.8 g) and triethylamine (30 ml) in THF (50 ml), a solution of methanesulfonyl chloride (1.14 g) in THF (10 ml) was drop wise added. After complete addition (15 min) the reaction mixture was further stirred for 2 h at −10° C. then for 30 min at 0° C. It was then filtered over celite and evaporated to dryness to give nearly pure (2S)-2-methylbutyl methanesulfonate as yellowish oil.

Yield: 16.5 g.

b) (2S)-2-methylbutyl 2,5-dihydroxybenzoate

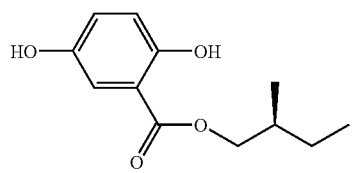

To a solution of 2,5-dihydroxybenzoic acid (15.4 g) in DMF (50 ml) DBU (15.3 ml) was drop wise added. After complete addition (10 min) stirring was continued for 30 min at room temperature, then a solution of (2S)-2-methylbutyl methanesulfonate (16.4 g) in DMF (20 ml) was added drop wise. After complete addition (30 min) the reaction mixture was heated to 80° C. for 6 h. It was then cooled to room temperature, poured into saturated solution of $NaHCO_3$ (200 ml) and extracted with ethyl acetate (2×300 ml). The combined extracts were dried over $Na_2SO_4$ and evaporated to dryness. The obtained dark oily residue was purified over silica gel column to give nearly pure (2S)-2-methylbutyl 2,5-dihydroxybenzoate as beige oil.

Yield: 22 g.

c) (2S)-2-methylbutyl 2,5-bis[(4-{[6-(acryloyloxy)hexyl]oxy}benzoyl)oxy]benzoate; Additive Nr. 3

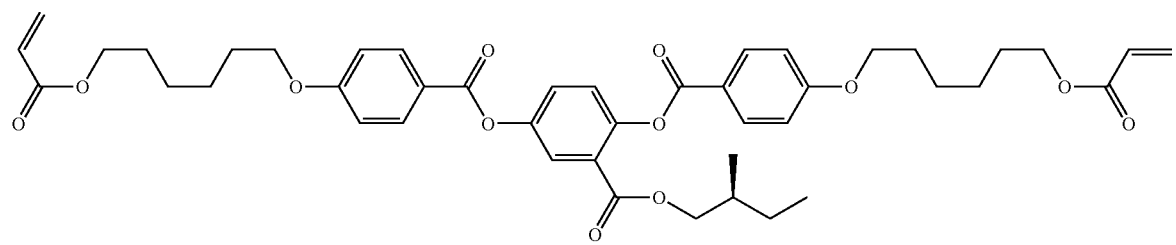

A mixture consisting of 4-{[6-(acryloyloxy)hexyl]oxy}benzoic acid (2.92 g), (2S)-2-methylbutyl 2,5-dihydroxybenzoate (1.1 g), DMAP (0.24 g) and EDC (2 g) in $CH_2Cl_2$ (30 ml) was stirred for 6 h at room temperature. The yellowish reaction mixture was then evaporated to dryness and the obtained pasty residue was purified by column chromatography over silica to give nearly pure material as transparent oil which becomes pasty upon standing for about 24 h.

Yield: 3.2 g.

$T_{iso}$: 33° C.

EXAMPLE 4

Preparation of Additive No. 4

(R,S)-2-[(4'-cyano-1,1'-biphenyl-4-yl)oxy]propyl acrylate

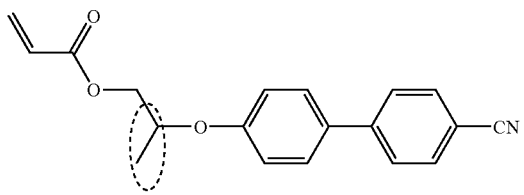

To a 0° C. cooled mixture of 4'-hydroxy-1,1'-biphenyl-4-carbonitrile (12 g), 2-hydroxypropyl acrylate (10.4 g) and triphenyl phosphine (15.8 g) in 400 ml of THF, DIAD (13.7 g; 13.1 ml) was dropwise added. After complete addition (15 min) the reaction mixture was gradually allowed to reach room temperature and stirring was maintained for further 70 h. The obtained reaction mixture was then evaporated to dryness and the obtained orange residue was purified by silica gel column chromatography. This provides pure 2-[(4'-cyano-1,1'-biphenyl-4-yl)oxy]propyl acrylate as transparent oily material.

Yield: 11.2 g.

$T_{iso}$: −28.1° C.

EXAMPLE 5

Preparation of Additive No. 5

(R,S)-2-[4-(phenylethynyl)phenoxy]propyl 2-methylacrylate

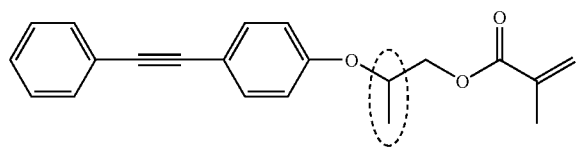

a) 2-(4-bromophenoxy)propyl 2-methylacrylate

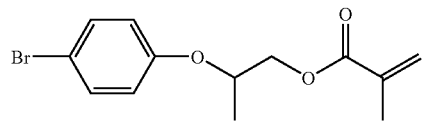

Following the same preparation procedure of Example 2, the reaction was carried out with 4-hydroxy bromophenol (4 g), 2-hydroxypropyl 2-methylacrylate (3.33 g), triphenyl phosphine (6.06 g) and DIAD (4.69 g) in 50 ml of THF to give after chromatography purification pure 2-(4-bromophenoxy)propyl 2-methylacrylate as pale yellow oil.

Yield: 4.8 g.

b) 2-[4-(phenylethynyl)phenoxy]propyl 2-methylacrylate; Additive No. 5

A degassed mixture consisting on 2-(4-bromophenoxy)propyl 2-methylacrylate (2.99 g), ethynylbenzene (1.2 g), Pd (PPh$_3$)$_4$ (0.11 g), CuI (0.02 g) in triethalymine (50 ml) was maintained under nitrogen atmosphere and refluxed for 5 h. The cooled reaction mixture was filtered over celite and the filtrate was evaporated to dryness. The obtained dark oily residue was purified by chromatography on silica to give nearly pure 2-[4-(phenylethynyl)phenoxy]propyl 2-methylacrylate as yellowish oil.

Yield: 0.71 g.

$T_{iso}$: −36.1° C.

EXAMPLE 6

Preparation of Additive No. 6

8-({2,5-bis[(4-{[6-(acryloyloxy)hexyl]oxy}benzoyl)oxy]benzoyl}oxy)octyl tetrahydro-2-furancarboxylate

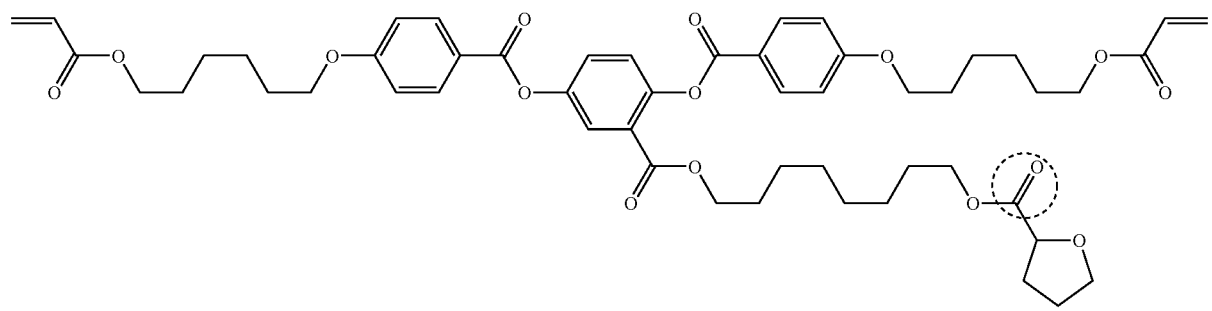

a) 8-chlorooctyl tetrahydro-2-furancarboxylate

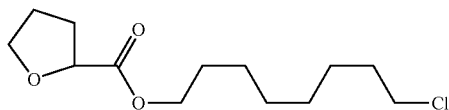

A solution of N-(3-Dimethylaminopropyl)-N'-ethylcarbodiimide hydrochloride (5.7 g) in dichloromethane (100 ml) was slowly added to a solution of 8-chloro-1-octanol (4.1 g), tetrahydro-2-furancarboxylic acid (3.5 g) and 4-dimethylaminopyridine (1.5 g) in dichloromethane (50 ml) at 0° C. The mixture was stirred overnight at room temperature. The resulting solution was then added to water (500 ml) and extracted with dichloromethane (3×200 ml). The combined organic layers were washed with water (2×200 ml), dried over magnesium sulphate and filtered. The solvent removed in vacuum. The residue (7 g) was purified by column flash chromatography on silica gel using toluene/ethyl acetate (90:10) as eluent to give 8-chlorooctyl tetrahydro-2-furancarboxylate.

Yield: 6.9 g c) 8-[(2,5-dihydroxybenzoyl)oxy]octyltetrahydro-2-furancarboxylate

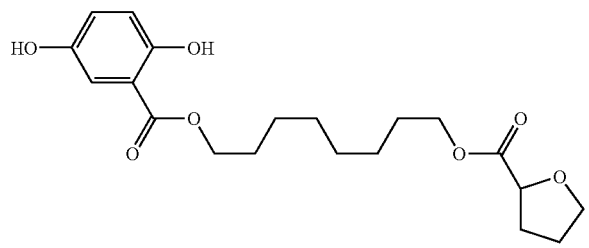

A mixture of 2,5-dihydroxybenzoic acid (3.9 g), 1,8-diazobicyclo[5.5.0]undec-7-ene (3.8 g), 8-chlorooctyl tetrahydro-2-furancarboxylate (6.0 g), potassium iodide (30.2 g) and acetonitrile (110 ml) was heated, under reflux for 72 h. The cooled reaction mixture was added to water (500 ml) and extracted with ethyl acetate (3×100 ml). The combined organic layers were washed with 1N-hydrochloric acid (150 ml) and water (2×15 ml), dried over magnesium sulphate and filtered. The solvent was removed in vacuum. The residue (8.0 g) was purified by column flash chromatography on silica gel using toluene/ethyl acetate (3:1) as eluent, to give 8-[(2,5-dihydroxybenzoyl)oxy]octyltetrahydro-2-furancarboxylate as colourless oil.

Yield: 7.2 g d) 8-({2,5-bis[(4-{[6-(acryloyloxy)hexyl]oxy}benzoyl)oxy]benzoyl}oxy)octyl tetrahydro-2-furancarboxylate

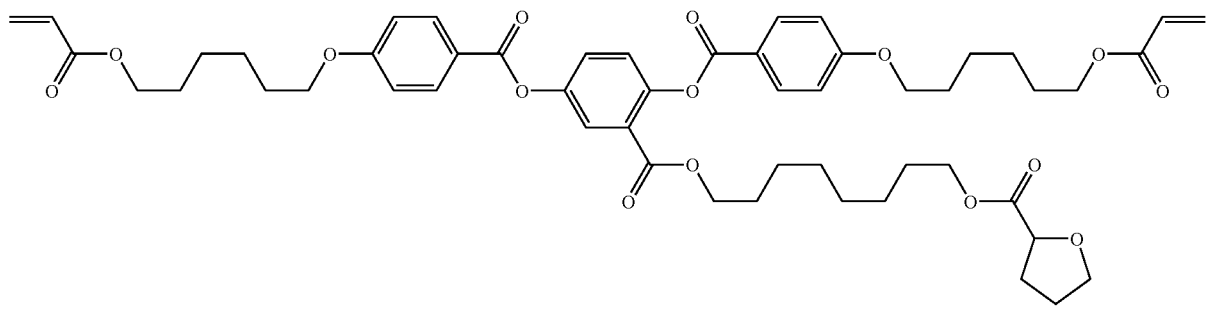

A solution of N-(3-dimethylaminopropyl)-N'-ethylcarbodiimide hydrochloride (3.8 g) in dichloromethane (70 ml) was slowly added to a solution of 8-[(2,5-dihydroxybenzoyl)oxy]octyltetrahydro-2-furancarboxylate (3.0 g), 4-(6-acryloylhexyloxy)benzoic acid (5.8 g) and 4-dimethylaminopyridine (0.5 g) in dichloromethane (60 ml) at 0° C. The mixture was stirred overnight at room temperature. The resulting solution was then added to water (350 ml) and extracted with dichloromethane (3×150 ml). The combined organic layers were washed with water (2×150 ml), dried over magnesium sulphate and filtered. The solvent removed in vacuum. The residue (10.2 g) was purified by column flash chromatography on silica gel using toluene/ethyl acetate (83:17) as eluent to give 8-({2,5-bis[(4-{[6-(acryloyloxy)hexyl]oxy}benzoyl)oxy]benzoyl}oxy)octyl tetrahydro-2-furancarboxylate Yield: 4.0 g $T_{iso}$: 27° C.

EXAMPLE 7

Preparation of Additive No. 7

8-(2-furylmethoxy)-8-oxooctyl 2,5-bis[(4-{[6-acryloyloxy)hexyl]oxy}benzoyl)oxy]benzoate

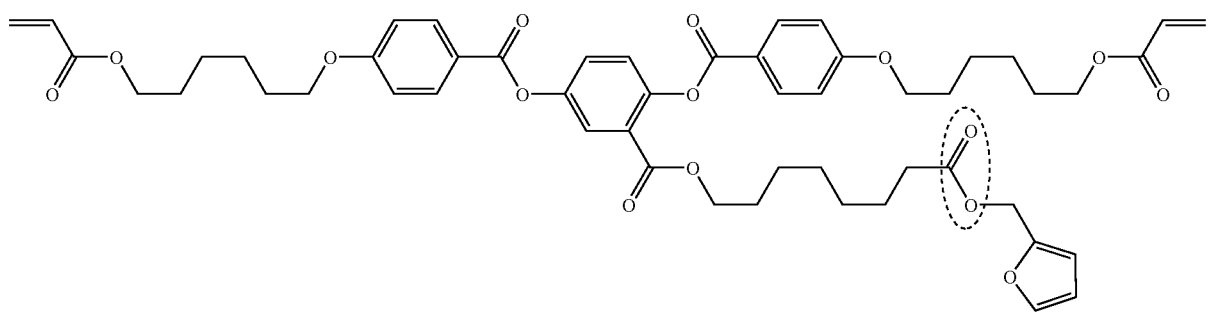

a) 2-furylmethyl 8-bromooctanoate

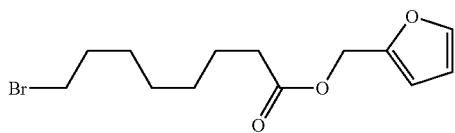

A solution of N-(3-Dimethylaminopropyl)-N'-ethylcarbodiimide hydrochloride (7.3 g) in dichloromethane (150 ml) was slowly added to a solution of 2-furylmethanol (2.9 g) 8-bromooctanoic acid (8.0 g) and 4-dimethylaminopyridine (1.2 g) in dichloromethane (50 ml) at 0° C. The mixture was stirred overnight at room temperature. The resulting solution was then added to water (500 ml) and extracted with dichloromethane (3×150 ml). The combined organic layers were washed with water (2×200 ml), dried over magnesium sulphate and filtered. The solvent removed in vacuum. The residue to give 2-furylmethyl 8-bromooctanoate.

Yield: 7.8 g b) 8-(2-furylmethoxy)-8-oxooctyl 2,5-dihydroxybenzoate

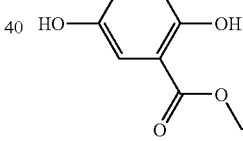

A mixture of 2,5-dihydroxybenzoic acid (4.8 g), 1,8-diazobicyclo[5.5.0]undec-7-ene (4.7 g), 2-furylmethyl 8-bromooctanoate (7.8 g) and acetonitrile (150 ml) was heated, under reflux for 18 h. The cooled reaction mixture was added to water (500 ml) and extracted with ethyl acetate (3×200 ml). The combined organic layers were washed with 1N-hydrochloric acid (150 ml) and water (2×20 ml), dried over magnesium sulphate and filtered. The solvent was removed in vacuum. The residue (8.4 g) was purified by column flash chromatography on silica gel using toluene/ethyl acetate (5:1) as eluent, to give 8-(2-furylmethoxy)-8-oxooctyl 2,5-dihydroxybenzoate as colourless oil.

Yield: 6.8 g c) 8-(2-furylmethoxy)-8-oxooctyl 2,5-bis[(4-{[6-(acryloyloxy)hexyl]oxy}benzoyl)oxy]benzoate A mixture of 2,5-dihydroxybenzoic acid (28 g), 1,8-diazobicyclo[5.5.0]undec-7-ene (27.6 g), 1-bromo-heptane (39 g) and acetonitrile (380 ml) was heated, under reflux for 18 h.

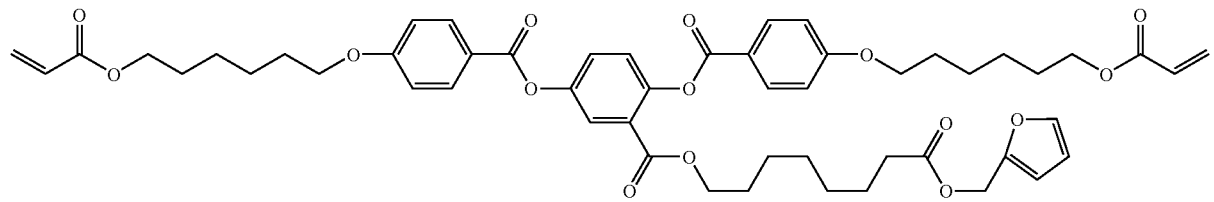

A solution of N-(3-dimethylaminopropyl)-N'-ethylcarbodiimide hydrochloride (4.8 g) in dichloromethane (60 ml) was slowly added to a solution of 8-(2-furylmethoxy)-8-oxooctyl 2,5-dihydroxybenzoate (3.7 g), 4-(6-acryloylhexyloxy)benzoic acid (7.3 g) and 4-dimethylaminopyridine (0.6 g) in dichloromethane (150 ml) at 0° C. The mixture was stirred overnight at room temperature. The resulting solution was then added to water (600 ml) and extracted with dichloromethane (3×200 ml). The combined organic layers were washed with water (2×200 ml), dried over magnesium sulphate and filtered. The solvent removed in vacuum. The residue (10.4 g) was purified by column flash chromatography on silica gel using toluene/ethyl acetate (95:5) as eluent, to give 8-(2-furylmethoxy)-8-oxooctyl 2,5-bis[(4-{[6-(acryloyloxy)hexyl]oxy}benzoyl)oxy]benzoate.

Yield: 4.8 g $T_{iso}$: 33.1° C.

EXAMPLE 8

Preparation of Additive No. 8

Heptyl 2,5-bis{[4-({6-oxo-6-[2-(vinyloxy)ethoxy]hexyl}oxy)benzoyl]-oxy}benzoate

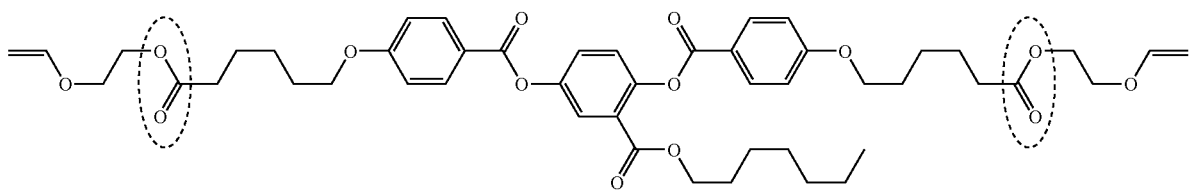

a) Heptyl 2,5-dihydroxybenzoate

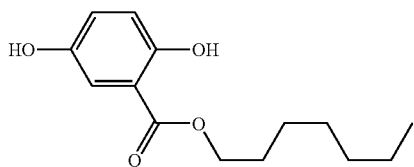

The cooled reaction mixture was added to water (1000 ml) and extracted with ethyl acetate (3×400 ml). The combined organic layers were washed with 1N-hydrochloric acid (300 ml) and water (2×400 ml), dried over magnesium sulphate and filtered. The solvent was removed in vacuum. The residue (40 g) was purified by column flash chromatography on silica gel using toluene/ethyl acetate (9:1) as eluent, to give heptyl 2,5-dihydroxybenzoate.

Yield: 40 g b) 4-{[6-(tetrahydro-2H-pyran-2-yloxy)hexyl]oxy}benzoic acid

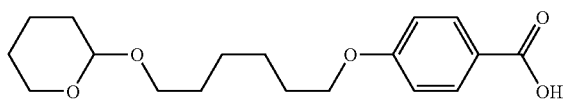

A solution of 3,4-Dihydro-2H-pyran (24.7 g) was added drop wise at room temperature to a solution of 4[(6-hydroxyhexyl)oxy]benzoic acid (35 g), toluene-4-sulfonic acid monohydrate (1.8) in diethylether (440 ml) and stirred at room temperature for 18 h. The resulting mixture was filtered over Hyflo Super Cel (FLUKA), organic solvents were removed in vacuum. The residue (60 g) was purified by column flash chromatography on silica gel using toluene/ethyl acetate (1:1) as eluent, to give after crystallisation from ethyl acetate/hexane (5:40) 4{[6(tetrahydro-2H-pyran-2-yloxy)hexyl]oxy}benzoic acid.

Yield: 32 g c) Heptyl 2,5-bis[(4-{[6-(tetrahydro-2H-pyran-2-yloxy)hexyl]oxy}benzoyl)oxy]benzoate

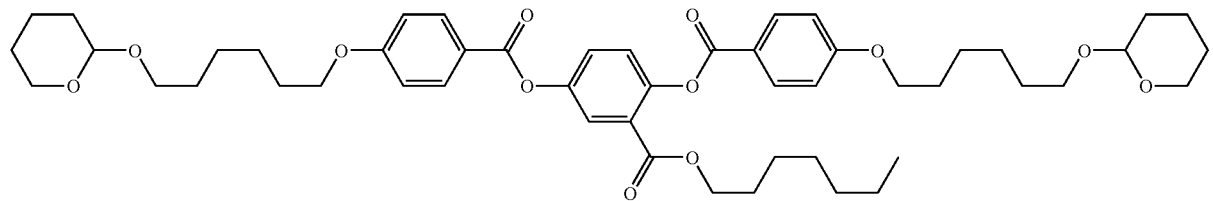

A solution of N-(3-Dimethylaminopropyl)-N'-ethylcarbodiimide hydrochloride (7.7 g) in dichloromethane (120 ml) was slowly added to a solution of heptyl 2,5-dihydroxybenzoate (5 g), 4-{[6-tetrahydro-2H-pyran-2-yloxy)hexyl]oxy}benzoic acid (16.0 g) and 4-dimethylaminopyridin (1.2 g) in dichloromethane (150 ml) at 0° C. The mixture was stirred overnight at room temperature. The resulting solution was then added to water (600 ml) and extracted with dichloromethane (3×200 ml). The combined organic layers were washed with water (2×200 ml), dried over magnesium sulphate and filtered. The solvent removed in vacuum. The residue (22.2 g) was purified by column flash chromatography on silica gel using toluene/ethyl acetate (9:1) as eluent, to give heptyl 2,5-bis[(4-{[6-(tetrahydro-2H-pyran-2-yloxy)hexyl]oxy}benzoyl)oxy]benzoate.

Yield: 14.7 g d) Heptyl 2,5-bis({4-[(6-hydroxyhexyl)oxy]benzoyl}oxy)benzoate

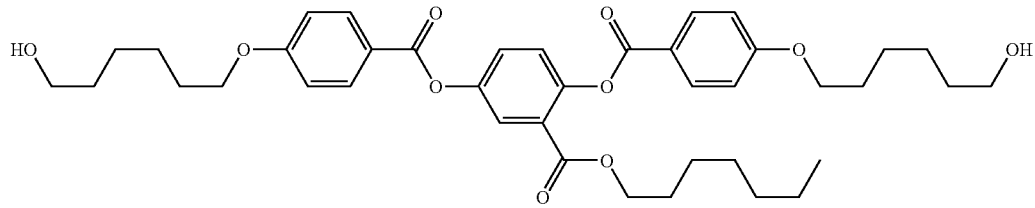

Bis-(trimethylsilyl)-sulfat (0.5 g) were added to a solution of heptyl 2,5-bis-({4-[(6-hydroxyhexyl)oxy]benzoyl}oxy)benzoate (14.7 g) in methanol (250 ml) and dichloromethane (40 ml). The reaction mixture was heated, under reflux for 2 h. The cooled reaction mixture was added to water (700 ml) and extracted with ethyl acetate (3×300 ml). The combined organic layers were washed with saturated sodium hydrogen carbonate solution (2×200 ml), dried over magnesium sulphate and filtered. The solvent was removed in vacuum, the residue to give heptyl 2,5-bis({4-[(6-hydroxyhexyl)oxy]benzoyl}oxy)benzoate.

Yield: 9.7 g e) 6-[4-({4-[(5-carboxypentyl)oxy]benzoyl}oxy)-2-[(heptyloxy)carbonyl]phenoxy}carbonyl)phenoxy]hexanoic acid

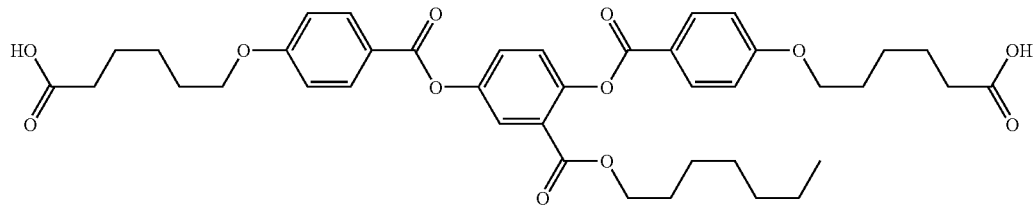

Heptyl2,5-bis({4-[(6-hydroxyhexyl)oxy]benzoyl}oxy)benzoate (7.2 g), sodium hydrogen carbonate (3.5) and potassium bromide (2.5 g) were dissolved in dichloromethane (50 ml) and deionised water (50 ml) and the two-phase reaction mixture was cooled to 0° C. After the addition of 2,2,6,6,-tetramethyl-piperidine-1-oxyl (31 mg), 9.9%-aqueous sodium hypochlorite (45 g) were added under vigorous stirring at 0° C. over 0.5 h. After additional stirring at 0° C. for 3 h the reaction mixture was acidified with 6N-hydrochloric acid and the excess of the sodium hypochlorite was destroyed with aqueous sodium bisulfite. The aqueous layer was extracted with dichloromethane (2×100 ml) and both organic layers were washed with 10%-brine (2×80 ml), dried over magnesium sulphate and filtered. The solvent was removed in vacuum, the residue to give 6-[4-({4-[(5-carboxypentyl)oxy]benzoyl}oxy)-2-[(heptyloxy)carbonyl]phenoxy}carbonyl)phenoxy]hexanoic acid.

Yield: 4.0 g f) Heptyl2,5-bis{[4-({6-oxo-6-[2-(vinyloxy)ethoxy]hexyl}oxy)benzoyl]-oxy}benzoate

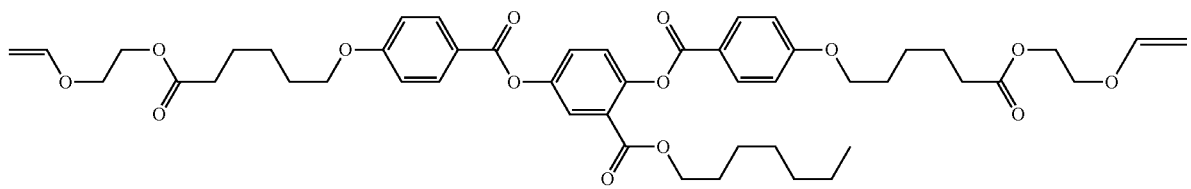

A solution of N-(3-Dimethylaminopropyl-N'-ethylcarbodiimide hydrochloride (0.44 g) in dichloromethane (20 ml) was slowly added to a solution of 6-[4-({4-[(5-carboxypentyl)oxy]benzoyl}oxy)-2-[(heptyloxy)carbonyl]phenoxy}carbonylphenoxy]-hexanoic acid (2.0 g), 2-(vinyloxy)ethanol (0.6 g) and 4-dimethylaminopyridine (0.17 g) in dichloromethane (80 ml) at 0° C. The mixture was stirred overnight at room temperature. The resulting solution was then added to water (150 ml) and extracted with dichloromethane (2×60 ml). The combined organic layers were washed with water (2×60 ml), dried over magnesium sulphate and filtered. The solvent removed in vacuum. The residue (2.1 g) was purified by column flash chromatography on silica gel using toluene/ethyl acetate (92:8) as eluent, to give heptyl 2,5-bis{[4({6-oxo-6-[2-(vinyloxy)ethoxy]hexyl}oxy)benzoyl]oxy}benzoate.

Yield: 0.3 g $T_{iso}$: 10.2° C.

Advantages of Using Compounds of Formula (I) for Improving the Manufacture of LCP-Films are Demonstrated in the Following Examples by Comparison.

For the orientation of the LCP layers photo-orientated (LPP) layers were used. These photo-oriented layers were obtained through application of the linearly photo-polarizable aligning (LPP) technique (contact-free alignment of LPP-mixtures suitable for linear photo-polymerization, using polarized light).

The LPP layers used herein below were produced according to the following procedure:

The cleaned glass substrate was coated with a 2-3% cyclpentanone solution of Staralign 2110 (LPP mixture commercially available from Vantico). The solution was spin-coated at a speed of 2000 rpm which resulted in a thin polymer layer of about 40 nm. Then the layer was annealed at 180° C. for 10 minutes followed by irradiation with linear polarized UVB light (approx. 1 J/cm$^2$).

EXAMPLE 9

Demonstrating Acceleration of Orientation Due to Additive Components According to the Invention a) The following polymerizable cholesteric mixture (I) was formulated:

4% Chiral compound LC756 (commercially available from BASF)

95% LCP compound LC242 (commercially available from BASF)

1% Irgacure 184 (Photoinitiator, commercially available from Ciba)

The aforementioned host mixture did not contain an additive compound according to the invention and thus was used as comparative example.

The mixture was dissolved in Anisole (Merck) (50% by weight) and spin-coated on a glass substrate provided with above quoted LPP-orientation layer. Spin-coating parameters: 700 UpM/1 Minute resulting in a 4.5 μm thick layer. Then the sample was heated to 85° C. and the remaining solvent was allowed to evaporate.

This treatment created a polydomain film with a dense net of disclination lines leading to a strongly scattering texture. These disclination lines were reduced during annealing and a yellow color appeared. But the layer remained strongly scattering even after 15 minutes of annealing.

b) In the next experiment the 95% LC242-component of mixture (I) was replaced by 85% LC242 plus 10% of Additive No. 2, (R,S)-2-[(4'-cyano-1,1'-biphenyl-4-yl)oxy]propyl 2-methylacrylate (Example 2), while keeping the concentrations of the other compounds constant. Then the treatment as described above under 9a) was repeated.

In this case the disclination lines vanished slowly during annealing and a green eflection band appeared. After 5 minutes the film was only weakly scattering and showed the typical reflection band.

c) In a further experiment the 10% part of Additive No. 2 used in above mixture described under 9b) was replaced by 10% of Additive No. 4, (R,S)-2-[(4'-cyano-1,1'-biphenyl-4-yl)oxy]propyl acrylate (Example 4), while keeping the concentration of the other compounds constant. Again the treatment of 9a) was repeated. A layer of 5 μm was produced. After about 6 minutes the layer was oriented and showing an only weakly scattering red reflection band.

d) In a further experiment the 10% part of Additive No. 2 used in above mixture described under 9b) was replaced by 10% of Additive No. 3, (2S)-2-methylbutyl 2,5-bis[(4-{[6-(acryloyloxy)hexyl]oxy}benzoyl)oxy]benzoate (Example 3), while keeping the concentration of the other compounds constant. Again the treatment of 9a) was repeated. A layer of 5.1 μm thickness was produced. After about one minute the layer was nearly perfectly orientated showing a cholesteric monodomain with a few well separated disclination lines. The reflection band was centered around 588 nm.

e) In a further experiment the 10% part of Additive No. 2 used in above mixture described under 9b) was replaced by 10% of Additive No. 1, (D,L)-4-{[4-({6-[2-(acryloyloxy)ethoxy]-6-oxohexyl}oxy)benzoyl]oxy}-2-methylphenyl 4-({6-[2-(acryloyloxy)ethoxy]-6-oxohexyl}oxy)benzoate (Example 1), while keeping the concentration of the other compounds constant. Again the treatment of 9a) was repeated. A layer of 5.9 μm thickness was produced. After about 5 minutes the layer was nearly perfectly orientated showing a cholesteric monodomain with a few well separated disclination lines. The reflection band was centered around 605 nm.

f) In a further experiment the 10% part of Additive No. 2 used in above mixture described under 9b) was replaced by 10% of Additive No. 5, (R,S)-2-[4-(phenylethynyl)phenoxy]propyl 2-methylacrylate (Example 5), while keeping the concentration of the other compounds constant. Again the treatment of 9a) was repeated. A layer of 5.4 μm thickness was produced. After about 1 minute the layer was nearly perfectly orientated showing a cholesteric monodomain with a few well separated disclination lines. The reflection band was centered around 590 nm.

g) In a further experiment the 95% LC242 component of mixture I was replaced by 93% LC 242 plus 2% of Additive No. 6,8-({2,5-bis[(4-{[6-(acryloyloxy)hexyl]oxy}benzoyl)oxy]benzoyl}oxy)octyl tetrahydro-2-furancarboxylate (Example 6), while keeping the concentration of the other compounds constant. Again the treatment of 9a) was repeated. A layer of 6.2 µm thickness was produced. After about 20 seconds the layer was orientated showing a weakly scattering red reflection band. After 3 minutes all disclinations had disappeared.

h) In a further experiment the 10% part of Additive No. 2 used in above mixture described under 9b) was replaced by 10% of Additive No. 7,8-(2-furylmethoxy)-8-oxooctyl 2,5-bis[(4-{[6-acryloyloxy)hexyl]oxy}benzoyl)oxy]benzoate (Example 7), while keeping the concentration of the other compounds constant. Again the treatment of 9a) was repeated. A layer of 6.1 µm thickness was produced. After about 6 minutes the layer was nearly perfectly orientated showing a weakly scattering green reflection band.

i) In a further experiment the 95% LC242 component of mixture I was replaced by 93% LC 242 plus 2% of Additive No. 8, Heptyl 2,5-bis{[4-({6-oxo-6-[2-(vinyloxy)ethoxy]hexyl}oxy)benzoyl]-oxy}benzoate (Example 8), while keeping the concentration of the other compounds constant. Although only 2% of Additive No. 8 was added the layer started orienting already after about 1 minute and comprised a weakly scattering texture after about 5 minutes (thus being significantly superior to Example 9a).

EXAMPLE 10

Demonstrating Improvement of Film Quality Due to Additive Components According to the Invention a) The following polymerizable cholesteric mixture (II) was formulated:

13% 1,2-Bis-{2,5-bis-[4-(6-acryloyloxyhexyloxy)benzoyloxy]benzoic acid}-diisopropyl L-tartarylester (described in WO 01/47862, Example 1)

86% 10-[(4'-cyano-1,1'-biphenyl-4-yl)oxy]decyl 2,5-bis-[4-(6-acryloyloxyhexyloxy)benzoyloxy]benzoate (described in WO 00/55110, method of manufacture similar to Example 1)

1% Irgacure 184 (Photoinitiator, commercially available from Ciba)

The aforementioned host mixture did not contain an additive compound according to the invention and thus was used as comparative example.

The mixture was dissolved in Anisole (Merck) (42% by weight) and spin-coated on a glass substrate provided with above quoted LPP-orientation layer. Spin-coating parameters: 700 rpm for 1 minute, resulting in a 4.0 µm thick layer. Then the sample was heated to 82° C. and the remaining solvent was allowed to evaporate.

This treatment created a polydomain film with a dense net of disclination lines leading to a strongly scattering texture. These disclination lines were reduced during annealing, however, they did not disappear completely even after about 15 minutes. The film showed a cholesteric long pitch reflection band around 850 nm.

b) In the next experiment the 86% of LCP compound 10-[(4'-cyano-1,1'-biphenyl-4-yl)oxy]decyl 2,5-bis-[4-(6-acryloyloxyhexyloxy)benzoyloxy]benzoate of mixture (II) was replaced by 76% of LCP compound 10-[(4'-cyano-1,1'-biphenyl-4-yl)oxy]decyl 2,5-bis-[4-(6-acryloyloxyhexyloxy)benzoyloxy]benzoate plus 10% of Additive No. 2, (R,S)-2-[(4'-cyano-1,1'-biphenyl-4-yl)oxy]propyl 2-methylacrylate (Example 2), while keeping the concentrations of the other compounds constant. Then the treatment as described above under 10a) was repeated.

In this case a weakly scattering transparent film was generated within 3 minutes exhibiting a red reflection band around 650 nm.

c) The following polymerizable cholesteric mixture (III) was formulated:

11% 1,2-Bis-{2,5-bis-[4-(6-acryloyloxyhexyloxy)benzoyloxy]benzoic acid}-diisopropyl L-tartarylester (described in WO 01/47862, Example 1)

62% 10-[(4'-cyano-1,1'-biphenyl-4-yl)oxy]decyl 2,5-bis-[4-(6-acryloyloxyhexyloxy)benzoyloxy]benzoate (described in WO 00/55110, method of manufacture similar to Example 1)

26% LCP compound LC242 (commercially available from BASF)

1% Irgacure 184 (Photoinitiator, commercially available from Ciba)

The aforementioned host mixture did not contain an additive compound according to the invention and thus was used as comparative example.

The mixture was dissolved in Anisole (Merck) (50% by weight) and spin-coated on a glass substrate provided with above quoted LPP-orientation layer. Spin-coating parameters: 700 rpm for 1 minute, resulting in a 4.0 µm thick layer. Then the sample was heated to 82° C. and the remaining solvent was allowed to evaporate.

This treatment created a polydomain film with a dense net of disclination lines leading to a strongly scattering texture. These disclination lines were reduced during annealing, however, they did not disappear completely even after about 15 minutes. A long pitch reflection band around 760 nm was generated.

d) In the next experiment the 62% of LCP compound 10-[(4'-cyano-1,1'-biphenyl-4-yl)oxy]decyl 2,5-bis-[4-(6-acryloyloxyhexyloxy)benzoyloxy]benzoate was replaced by 52% of LCP compound 10-[(4'-cyano-1,1'-biphenyl-4-yl)oxy]decyl 2,5-bis-[4-(6-acryloyloxyhexyloxy)benzoyloxy]benzoate plus 10% of Additive No. 2, (R,S)-2-[(4'-cyano-1,1'-biphenyl-4-yl)oxy]propyl 2-methylacrylate (Example 2), while keeping the concentrations of the other compounds constant. Then the treatment as described under 10c) was repeated.

In this case a weakly scattering transparent film was generated within 3 minutes with a red reflection band around 650 nm.

EXAMPLE 11

Demonstrating Improvement of Compatibility of the Components Due to Additive Components According to the Invention a) The following polymerizable cholesteric mixture (IV) was formulated:

10% 1,2-Bis-{2,5-bis-[4-(6-acryloyloxyhexyloxy)benzoyloxy]benzoic acid}-diisopropyl L-tartarylester (described in WO 01/47862, Example 1)

89% LCP compound LC242 (commercially available from BASF)

1% Irgacure 184 (Photoinitiator, commercially available from Ciba)

The aforementioned host mixture did not contain an additive compound according to the invention and thus was used as comparative example.

The mixture was dissolved in Anisole (Merck) (50% by weight) and spin-coated on a glass substrate provided with above quoted LPP-orientation layer. Spin-coating parameters: 700 rpm for 1 minute, resulting in a 4.5 μm thick layer. Then the sample was heated to 85° C. and the remaining solvent was allowed to evaporate.

This treatment created a polydomain film with a dense net of disclination lines leading to a strongly scattering texture. These disclination lines vanished slowly during annealing and disappeared nearly completely after about 5 minutes. The procedure resulted in a weakly scattering film exhibiting a green reflection band. Then the sample was cooled down to room temperature; thereafter it was confirmed that the film remained homogeneously oriented. The sample was then irradiated with UV-light (5 mW around 360 nm for 5 minutes in $N_2$ atmosphere) to fix the orientation by cross-linking. After this treatment the sample scattered light due to phase separation which was induced by polymerization.

b) In the next experiment the 89% LC242-component of mixture (IV) was replaced by 79% LC242 lus 10% of Additive No. 2, (R,S)-2-[(4'-cyano-1,1'-biphenyl-4-yl)oxy]propyl 2-methylacrylate (Example 2), while keeping the concentrations of the other compounds constant. Then the treatment as described above under 11a) was repeated.

In this case no sign of phase separation was observed. This clearly shows that the addition of Additive No. 2 improves the compatibility of different components, in the case of the example the compatibility of chiral compound 1,2-Bis-{2,5-bis-[4-(6-acryloyloxyhexyloxy)benzoyloxy]benzoic acid}-diisopropyl L-tartarylester and LCP compound LC242.

The invention claimed is:

1. A mesogenic, cross-linkable mixture comprising:
    i) a cross-linkable liquid crystalline host comprising at least one cross-linkable liquid crystalline compound, and
    ii) at least one chiral or achiral rod shaped additive component, wherein the additive component is a compound of formula (I):

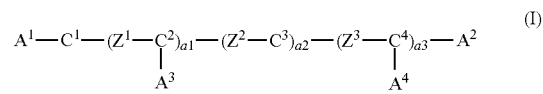

wherein:
$C^1$ to $C^4$ are selected from optionally substituted cyclohexyl or cyclohexylene, phenyl or phenylene, naphthyl or naphthylene or phenanthryl or phenanthrylene; connected to each other at the opposite positions via the bridging groups $Z^1$ to $Z^3$;
wherein $A^1$ to $A^3$ each independently represent hydrogen or a group represented by formula (II), and
wherein at least one of $A^1$ to $A^3$ has the meaning of formula (II),

wherein:
P is hydrogen or a polymerizable group which is $CH_2$=CW—, $CH_2$=CW—O—, $CH_2$=CW—COO—, wherein:
    W is H or $CH_3$,
Sp has the meaning of formula (III)

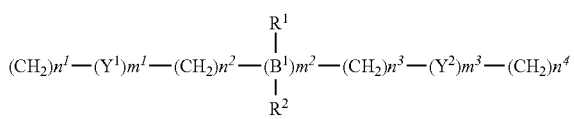

wherein:
$Y^1$ and $Y^2$ each independently represent —OCO— or —COO—,
$B^1$ represents C, which is chiral,
$R^1$ and $R^2$ each independently represent a $C_1$-$C_{12}$ alkyl residue,
$n^1$, $n^2$, $n^3$ and $n^4$ are independently integers from 0 to 15, such that $1 \leq n^1+n^2+n^3+n^4 \leq 15$;
$m^2$ is 1,
$m^1$ and $m^3$ are independently integers from 0 to 1, and
wherein:
one or more —$CH_2$— groups present in the hydrocarbon chain of (III) is unreplaced or replaced, independently, by one or more groups selected from —O—, —CH=CH— or —C≡C—, with the proviso that the carbon-carbon double bond of P is not directly connected to the carbon atom of $Y^1$ or $Y^2$, k is 0 or 1, with the proviso that in at least one $A^1$ to $A^3$ k is 1, X is —O—, —CO—, —COO—, —OCO—, —CH=CH—, —C≡C—, or a single bond, t is 1;

or wherein at least one of $A^1$ to $A^3$ has the meaning of formula (II),

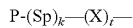  (II)

wherein:

P is hydrogen or a polymerizable group which is $CH_2$=CW—, $CH_2$=CW—O—, $CH_2$=CW—COO—, wherein:

W is H or $CH_3$,

Sp has the meaning of formula (III)

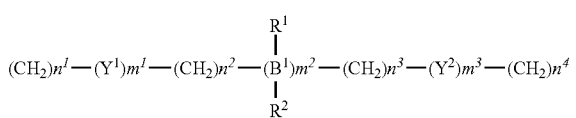  (III)

wherein:

$Y^1$ and $Y^2$ each independently represent —OCO— or —COO—, $B^1$ represents C or CH, $R^1$ and $R^2$ each independently represent hydrogen or a $C_1$-$C_{12}$ alkyl residue, $n^1$, $n^2$, $n^3$ and $n^4$ are independently integers from 1 to 15, such that $1 \leq n^1+n^2+n^3+n^4 \leq 15$;

$m^1$, $m^2$ and $m^3$ are 0 or 1, with the proviso that at least one of $m^1$ or $m^3$ is 1; and with the proviso that if $m^1$ is 1, then $n^1$ and at least one of $n^2$, $m^2$, $n^3$ or $n^4$ is 1; and if $m^3$ is 1 then $n^4$ is 1 and at least one of $n^1$, $n^2$, $m^2$ or $n^3$ is 1;

and wherein one or more —$CH_2$— groups present in the hydrocarbon chain of (III) is unreplaced or replaced, independently, by one or more groups selected from —O—, —CH=CH— or with the proviso that the carbon-carbon double bond of P is not directly connected to the carbon atom of $Y^1$ or $Y^2$, k is 0 or 1, with the proviso that at in least one of $A^1$ to $A^3$ k is 1, X is —O—, —CO—, —COO—, —OCO—, —CH=CH—, —C≡C—, or a single bond, t is 1;

$A^4$ is hydrogen, a polar group which is cyano, nitro, a halogen, or a group of formula (II)

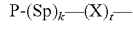  (II)

in which:

P is hydrogen or a polymerizable group which is $CH_2$=CW—, $CH_2$=CW—O—, $CH_2$=CW—COO— or

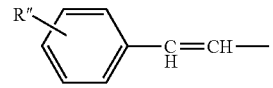

wherein:

W is H, $CH_3$, F, Cl, Br or I,

R" is a $C_{1-6}$ alkyl group, methoxy, cyano, F, Cl, Br or I,

Sp is a $C_{1-22}$ branched or straight-chain alkylene group, in which one or more —$CH_2$— groups present in the hydrocarbon chain may be replaced, independently, by one or more groups selected from —O—, —CH(OH)—, —$SO_2$—, —COO—, —OCO—, —OCO—O—, —CH=CH—, —C≡C—, —$(CF_2)_r$—, with the proviso that no two oxygen atoms are directly linked to each other, and wherein r is an integer between 1 and 10, k is 1, X is —O—, —CO—, —COO—, —OCO—, —CH=CH—, —C≡C—, or a single bond, t is 1, with the proviso that at least one of $A^1$ to $A^4$ comprises a polymerizable group which is $CH_2$=CW—, $CH_2$=CW—O—, $CH_2$=CW—COO— or

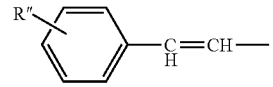

wherein:

W is H, $CH_3$, F, Cl, Br or I,

R" is a $C_{1-6}$ alkyl group, methoxy, cyano, F, Cl, Br or I;

$Z^1$ to $Z^3$ are independently from each other —CH(OH)—, —CO—, —$CH_2$(CO)—, —SO—, —$CH_2$(SO)—, —$SO_2$—, —$CH_2$($SO_2$)—, —COO—, —OCO—, —$COCF_2$—, —$CF_2$CO—, —S—CO—, —CO—S—, —SOO—, —OSO—, —SOS—, —$CH_2$—$CH_2$—, —$OCH_2$—, —$CH_2$O—, —CH=CH—, —C≡C—, —CH=CH—COO—, —OCO—CH=CH—, —CH=N—, —C($CH_3$)=N—, —N=N— or a single covalent bond, a1, a2 and a3 are independently from each other integers from 0 to 3, such that $1 \leq a1+a2+a3 \leq 3$, with the proviso that the sequence:

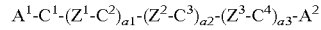

describes the long molecular axis of the rod shaped additive components and wherein the additive component changes from the liquid crystalline state to the isotropic state at a temperature of 20° C. or lower.

2. A mixture according to claim 1, wherein the additive component has a transition temperature to the isotropic state of 0° C. or lower.

3. A mixture according to claim 1 having a clearing temperature of 30° C. or higher.

4. A mixture according to claim 1 having a clearing temperature of 50° C. or higher.

5. A mixture according to any one of claims 1-4, wherein the liquid crystalline host has a clearing temperature of 50° C. or higher.

6. A mixture according to claim 1 comprising further agents, which are cross-linking agents, stabilizing agents, initiators, dyes, other chiral or achiral additives and plasticizers.

7. A mixture according to claim 1 in form of an elastomer, polymer gel, polymer network or polymer film.

8. A chiral or achiral rod shaped compound, wherein said formula (I):

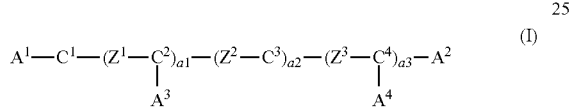

wherein:

$C^1$ to $C^4$ are selected from optionally substituted cyclohexyl or cyclohexylene, phenyl or phenylene, naphthyl or naphthylene or phenanthryl or phenanthrylene;

connected to each other at the opposite positions via the bridging groups $Z^1$ to $Z^3$;

wherein $A^1$ to $A^3$ each independently represent hydrogen or a group represented by formula (II), and wherein at least one of $A^1$ to $A^3$ has the meaning of formula (II),

wherein:

P is hydrogen or a polymerizable group which is $CH_2$=CW—, $CH_2$=CW—O—, $CH_2$=CW—COO—, wherein:

W is H or $CH_3$,

Sp has the meaning of formula (III)

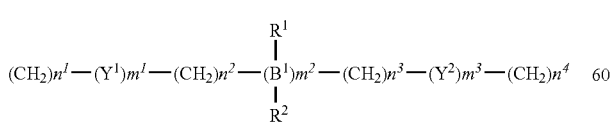

wherein:

$Y^1$ and $Y^2$ each independently represent —OCO— or —COO—, $B^1$ represents C or CH, $R^1$ and $R^2$ each independently represent a $C_1$-$C_{12}$ alkyl residue, $n^1$, $n^2$, $n^3$ and $n^4$ are independently integers from 0 to 15, such that $1 \leq n^1+n^2+n^3+n^4 \leq 15$;

$m^2$ is 1, $m^1$ and $m^3$ are independently integers from 0 to 1, and wherein:

one or more —$CH_2$— groups present in the hydrocarbon chain of (III) is unreplaced or replaced, independently, by one or more groups selected from —O—, —CH=CH— or —C≡C—, with the proviso that the carbon-carbon double bond of P is not directly connected to the carbon atom of $Y^1$ or $Y^2$, k is 0 or 1, with the proviso that in at least one $A^1$ to $A^3$ k is 1, X is —O—, —CO—, —COO—, —OCO—, —CH=CH—, —C≡C—, or a single bond, t is 1;

or wherein at least one of $A^1$ to $A^3$ has the meaning of formula (II),

wherein:

P is hydrogen or a polymerizable group which is $CH_2$=CW—, $CH_2$=CW—O—, $CH_2$=CW—COO—, wherein:

W is H or $CH_3$,

Sp has the meaning of formula (III)

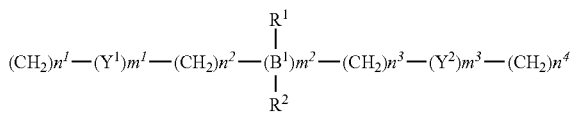

wherein:

$Y^1$ and $Y^2$ each independently represent —OCO— or —COO—, $B^1$ represents C or CH, $R^1$ and $R^2$ each independently represent hydrogen or a $C_1$-$C_{12}$ alkyl residue, $n^1$, $n^2$, $n^3$ and $n^4$ are independently integers from 1 to 15, such that $1 \leq n^1+n^2+n^3+n^4 \leq 15$;

$m^1$, $m^2$ and $m^3$ are 0 or 1, with the proviso that at least one of $m^1$ or $m^3$ is 1; and with the proviso that if $m^1$ is 1, then $n^1$ and at least one of $n^2$, $m^2$, $n^3$ or $n^4$ is 1; and if $m^3$ is 1 then $n^4$ is 1 and at least one of $n^1$, $n^2$, $m^2$ or $n^3$ is 1;

and wherein one or more —$CH_2$— groups present in the hydrocarbon chain of (III) is unreplaced or replaced, independently, by one or more groups selected from —O—, —CH=CH— or —C≡C—, with the proviso that the carbon-carbon double bond of P is not directly connected to the carbon atom of $Y^1$ or $Y^2$, k is 0 or 1, with the proviso that at in least one of $A^1$ to $A^3$ k is 1, X is —O—, —CO—, —COO—, —OCO—, —CH=CH—, or a single bond, t is 1;

$A^4$ is hydrogen, a polar group which is cyano, nitro, a halogen, or a group of formula (II)

$$P\text{-}(Sp)_k\text{—}(X)_t \qquad (II)$$

in which:

P is hydrogen or a polymerizable group which is $CH_2$=CW—, $CH_2$=CW—O—, $CH_2$=CW—COO— or

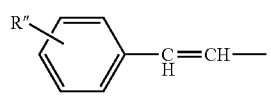

wherein:

W is H, $CH_3$, F, Cl, Br or I,

R" is a $C_{1-6}$ alkyl group, methoxy, cyano, F, Cl, Br or I,

Sp is a $C_{1-22}$ branched or straight-chain alkylene group, in which one or more —$CH_2$— groups present in the hydrocarbon chain may be replaced, independently, by one or more groups selected from —O—, —CH(OH)—, —$SO_2$—, —COO—, —OCO—, —OCO—O—, —CH=CH—, —C≡C—, —$(CF_2)_r$—, with the proviso that no two oxygen atoms are directly linked to each other, and wherein r is an integer between 1 and 10, k is 1, X is —O—, —CO—, —COO—, —OCO—, —CH=CH—, or a single bond, t is 1, with the proviso that at least one of $A^1$ to $A^4$ comprises a polymerizable group which is $CH_2$=CW—, $CH_2$=CW—O—, $CH_2$=CW—COO— or

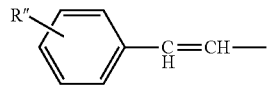

wherein:

W is H, $CH_3$, F, Cl, Br or I,

R" is a $C_{1-6}$ alkyl group, methoxy, cyano, F, Cl, Br or I;

$Z^1$ to $Z^3$ are independently from each other —CH(OH)—, —CO—, —$CH_2$(CO)—, —SO—, —$CH_2$(SO)—, —$SO_2$—, —$CH_2(SO_2)$—, —COO—, —OCO—, —$COCF_2$—, —$CF_2CO$—, —S—CO—, —CO—S—, —SOO—, —OSO—, —SOS—, —$CH_2$—$CH_2$—, —$OCH_2$—, —$CH_2O$—, —CH=CH—, —CH=CH—COO—, —OCO—CH=CH—, —CH=N—, —C($CH_3$)=N—, —N=N— or a single covalent bond, a1, a2 and a3 are independently from each other integers from 0 to 3, such that $$1 \leq a1+a2+a3 \leq 3,$$

with the proviso that the sequence:

$$A^1\text{-}C^1\text{-}(Z^1\text{-}C^2)_{a1}\text{-}(Z^2\text{-}C^3)_{a2}\text{-}(Z^3\text{-}C^4)_{a3}\text{-}A^2$$

describes the long molecular axis of the rod shaped additive components.

9. A method of using a chiral or achiral rod shaped compound, comprising preparing a mesogenic polymer mixture as described in claim 1 and having a transition temperature to the isotropic state of 20° C. or lower.

10. A polymer network prepared from a mixture according to claim 1.

11. A liquid crystalline polymer film prepared from a mixture according to claim 1.

12. A method of using a polymer network or a liquid crystalline polymer film, comprising preparing unstructured or structured optical and electro-optical components and multilayer systems from (A) a polymer network prepared from a mixture according to claim 1 or (B) a liquid crystalline polymer film prepared from a mixture according to claim 1.

13. A method of using a mesogenic, cross-linkable mixture, comprising preparing an elastomer, polymer gel, polymer network or polymer film from a mesogenic, cross-linkable mixture according to claim 1.

14. A method of using a polymer network, comprising manufacturing waveguides, optical gratings, filters, retarders, polarizers, piezoelectric cells or thin film exhibiting non-linear optical properties from a polymer network according to claim 10.

15. Optical or electro-optical components comprising a polymer network according to claim 10.

16. A method of using a liquid crystalline polymer film, comprising manufacturing waveguides, optical gratings, filters, retarders, polarizers, piezoelectric cells or thin film exhibiting non-linear optical properties from a liquid crystalline polymer film according to claim 11.

17. Optical or electro-optical components comprising a liquid crystalline polymer film according to claim 11.

* * * * *